US012173930B2

(12) United States Patent
Bissell et al.

(10) Patent No.: US 12,173,930 B2
(45) Date of Patent: Dec. 24, 2024

(54) INTERNALLY HEATED PHASE CHANGE MATERIAL HEAT BATTERIES

(71) Applicant: Sunamp Limited, Lothian (GB)

(72) Inventors: Andrew Bissell, Lothian (GB); Santokh Gataora, Lothian (GB); Jonathan Nicholson, Lothian (GB); Kieran Doak, Lothian (GB)

(73) Assignee: Sunamp Limited, Lothian (GB)

( * ) Notice: Subject to any disclaimer, the term of this patent is extended or adjusted under 35 U.S.C. 154(b) by 1004 days.

(21) Appl. No.: 17/263,363

(22) PCT Filed: Jul. 29, 2019

(86) PCT No.: PCT/GB2019/052119
§ 371 (c)(1),
(2) Date: Jan. 26, 2021

(87) PCT Pub. No.: WO2020/021288
PCT Pub. Date: Jan. 30, 2020

(65) Prior Publication Data
US 2021/0318028 A1 Oct. 14, 2021

(30) Foreign Application Priority Data

Jul. 27, 2018 (GB) ..................... 1812303

(51) Int. Cl.
*F24H 7/04* (2006.01)
*F24D 17/00* (2022.01)
*F28D 20/02* (2006.01)

(52) U.S. Cl.
CPC ....... *F24H 7/0441* (2013.01); *F24D 17/0089* (2013.01); *F28D 20/021* (2013.01); *F28D 20/028* (2013.01)

(58) Field of Classification Search
CPC .. F24H 7/0441; F24D 17/0089; F28D 20/021; F28D 20/028
(Continued)

(56) References Cited

U.S. PATENT DOCUMENTS 4,714,821 A * 12/1987 Jakobsson ............. F24D 11/002
126/400
6,493,507 B2 * 12/2002 Salyer ................... F24H 7/0433
126/400
(Continued)

FOREIGN PATENT DOCUMENTS

CN  1563812 A   1/2005
CN  105823214 A  8/2016
(Continued)

OTHER PUBLICATIONS

CN105823214, Li, partial translation, Aug. 2016 (Year: 2016).*
(Continued)

*Primary Examiner* — Steven W Crabb
*Assistant Examiner* — Alba T Rosario-Aponte
(74) *Attorney, Agent, or Firm* — Myers Bigel, P.A.

(57) ABSTRACT

There is herein defined phase change material (PCM) battery designs which are heated. More particularly, there is described integrally and/or internally located heating devices (e.g. electrical heating devices) in a range of heat batteries containing PCM. In particular, there is described a PCM heat battery comprising: a PCM enclosure capable of holding PCM; PCM located in the enclosure; an electronic control system for the PCM heat battery; a heating device located in the PCM heat battery; wherein the heating device is capable of heating and/or charging the PCM.

20 Claims, 21 Drawing Sheets

(58) Field of Classification Search
USPC .......................................................... 392/308
See application file for complete search history.

(56) References Cited

U.S. PATENT DOCUMENTS

| | | | |
|---|---|---|---|
| 9,801,482 B1* | 10/2017 | Alexander | ......... A47G 19/2288 |
| 2001/0028791 A1 | 10/2001 | Salyer | |
| 2009/0194257 A1 | 8/2009 | Niu et al. | |
| 2011/0083459 A1 | 4/2011 | Salyer | |
| 2012/0152511 A1 | 6/2012 | Chang et al. | |
| 2012/0319410 A1 | 12/2012 | Ambrosek et al. | |
| 2013/0266296 A1* | 10/2013 | Kreutzman | ............... H05B 3/48 |
| | | | 392/308 |
| 2016/0195340 A1* | 7/2016 | Bissell | .................. F28D 20/021 |
| | | | 165/10 |
| 2017/0205152 A1* | 7/2017 | Grama | .................... F28D 20/02 |
| 2017/0263954 A1* | 9/2017 | Shaikh | .............. H01M 8/04701 |
| 2018/0058769 A1* | 3/2018 | Bidner | .................... F28F 27/00 |

FOREIGN PATENT DOCUMENTS

| | | |
|---|---|---|
| CN | 106643251 A | 5/2017 |
| JP | 2001317886 A | 11/2001 |
| JP | 2017146014 A | 8/2017 |

OTHER PUBLICATIONS

International Preliminary Report on Patentability corresponding to International Patent Application No. PCT/GB2019/052119 (8 pages) (dated Nov. 25, 2020).

International Search Report and the Written Opinion of the International Searching Authority corresponding to International Patent Application No. PCT/GB2019/052119 (14 pages) (mailed Oct. 21, 2019).

* cited by examiner

INTERNALLY HEATED PHASE CHANGE MATERIAL HEAT BATTERIES

FIELD OF THE INVENTION

The present invention relates to phase change material (PCM) battery designs which are internally heated. More particularly, the present invention relates to integrally and/or internally located heating devices (e.g. electrical heating devices) in a range of heat batteries containing PCM.

BACKGROUND OF THE INVENTION

Heat batteries containing PCM used for transferring and/or storing heat are well-known. However, there are many problems with existing PCM battery technology.

In standard heat batteries containing PCM there are problems in efficiencies and for connecting multiple charging heat sources. Moreover, there are also problems in situations where a PCM heat battery has to be charged with an externally located primary heat source.

Further problems are found in prior art devices when an internal heating device is used to charge the PCM in a controlled manner as this requires very complex hydronic circuits. The complex hydronic circuits have been found to be extremely unreliable and also to routinely malfunction. The complex hydronic circuits are also expensive and difficult to maintain.

It is an object of at least one aspect of the present invention to obviate and/or mitigate at least one or more of the aforementioned problems.

It is a yet further object of the present invention to provide an improved heat battery containing PCM which provides technical efficiencies and benefits including flexibility for connecting to multiple charging heat sources.

It is a yet further object of the present invention to provide an improved heat battery containing PCM which includes the ability to be charged with an externally located primary heat source and/or by an internal heating device(s) in a controlled manner without the need for complex hydronic circuits.

SUMMARY OF THE INVENTION

According to a first aspect of the present invention there is provided a PCM heat battery with at least one, two or more or a plurality of an integral and/or internally located heating devices e.g. an electrical heating device.

According to a second aspect of the present invention there is provided a PCM heat battery comprising:
- a PCM enclosure capable of holding PCM;
- PCM located in the enclosure;
- an electronic control system for controlling the PCM heat battery;
- at least one or a plurality of heating devices located in the PCM heat battery; wherein the at least one or a plurality of heating devices are capable of heating and/or charging the PCM.

The present invention relates to improved heat battery designs wherein the heat battery(s) are PCM heat batteries with, for example, at least one or a plurality of heating devices which may be integrally and/or internally located within the PCM battery.

The PCM heat battery has the advantage of overcoming the requirement for complex hydronic circuits and any associated components and associated costs into the heat battery arrangement.

The PCM heat battery of the present invention provides an improved heat battery arrangement and design which provides improved technical efficiencies, benefits and especially flexibility for connecting to multiple charging heat sources.

Typically, the heating device may be located within the PCM enclosure. In some embodiments, the heating device may therefore be in direct contact and immersed in the PCM.

The PCM heat battery may comprise at least one, two, three, four, five or six heating devices.

Alternatively, the PCM heat battery may comprise at least two more, three or more, four or more, five or more or six or more heating devices.

The PCM heat battery may comprise a plurality of heating devices.

The heating devices may be described as being integrally and/or internally located within the PCM enclosure and therefore within the PCM heat battery.

The heating devices may be located at different levels (i.e. depths or heights) within the PCM enclosure. The heating devices may therefore be located at different vertical locations within the PCM enclosure.

The PCM heat battery may be charged with an external primary heat source, eliminating the requirement to have complex hydronic circuits. The PCM heat battery may therefore be charged by both an external primary heat source and also the heating device located in the PCM enclosure. The heating devices of the present invention may therefore be seen as a secondary heat source for the PCM heat battery. Such an arrangement allows the charge and/or temperature of the PCM to be very precisely controlled.

The PCM heat battery may comprise an outer casing for the whole of the PCM heat battery.

Located within the outer casing of the PCM heat battery there may be an insulation layer. The insulation layer may increase the thermal efficiency of the PCM heat battery and retain heat within the PCM enclosure.

The PCM enclosure may be a receptacle vessel located inside the outer casing and the insulation layer. The PCM enclosure may hold the PCM.

The insulation layer may therefore form a jacket and insulating layer around the PCM enclosure.

The PCM used in the present invention may be adapted and varied for the specific application and energy required. Any suitable type of PCM may therefore be used for a range of applications such as providing hot water in both domestic and industrial applications, storing energy and then displacing that energy.

The electronic control system may control the physical characteristics and/or temperature of the PCM by applying energy such as heat through the heating devices.

The heating devices may be any suitable element capable of providing energy and/or heat to the PCM. For example, the heating devices may be electrical heating elements which may be used to apply thermal energy to the PCM and thereby increase the temperature of the PCM.

The heating devices in the present invention may therefore be integrally and/or internally located electrical heating device(s). The heating devices may therefore in some embodiments be in direct contact with the PCM material.

The PCM may therefore in some embodiments be directly heated meaning that the circulation of fluids in circuits in the battery is not essential for the charging phase and is only present for the discharging of the heat battery. The present invention also overcomes the need for complex hydronic circuits.

In particular embodiments, the PCM heat battery may be a dual port heat battery.

The PCM heat battery may also comprise a heat exchanger which may, for example be a heat exchanger with a finned core. The heat exchanger may be located within the PCM enclosure.

The electronic control system of the present invention may comprise a low power circuit (LPC) and a high power circuit (HPC) which are used to provide an electrical connection for the PCM heat battery.

The electronic control system may also comprise an HPC inlet and an HPC outlet. There may also be an LPC inlet and LPC outlet. The inlets and outlets may be located on an upper i.e. top surface of the PCM heat battery.

There may also be a battery controller. There may also be a battery charge status signal and a battery charging control signal.

The PCM battery may be powered from a mains power supply.

The PCM heat battery may also comprise at least one or a plurality of sensors capable of monitoring the physical characteristics and/or temperature of the PCM and other parts of the heat battery. For example, there may be an overheat safety cut-off thermostat SO. Moreover, there may be temperature sensors e.g. temperature sensors S1, S2 and S3. The sensors e.g. temperature sensors may be distributed throughout the heat battery to obtain a temperature across the whole working medium.

The sensors may be located at different vertical locations in the PCM. This allows the physical characteristics and temperature of the PCM to be monitored throughout the whole of the PCM enclosure. For example, there may be a sensor(s) located in the top half, and/or about the middle and/or about towards the lower end of the PCM enclosure.

Any particular embodiment, the PCM heat battery may, for example, be of a dual port design with the heating device of the present invention being in the form of a back-up heater element e.g. an electrical heater element. There may be at least one or a plurality of back-up heater elements.

The dual port design of the present invention provides the technical advantage of being able to charge the heat battery with non-potable water. Moreover, the battery can be charged with simple and cheap, non-certified components. The heat may then be extracted with potable water. The heat battery of the present invention is therefore much improved over previous complex hydronic systems.

In particular embodiments, the heat battery may comprise a single or a plurality of heating device(s) which may, for example, be a standby electric heater which is located in the PCM. The heating device may be any form of electric heating device which may be located in the PCM. The heating device may therefore be described as being an integrally and/or internally located electrical heating device which is immersed in the PCM. It should be noted that the present invention may have at least one, two or a plurality of heating devices located in the PCM.

It has been found that the location of the heating device in the PCM enclosure and therefore the PCM has been found to be important. In particular embodiments the heating device e.g. electric heater may be located in the upper half of the PCM enclosure. By upper half we mean in the vertical upper half of the PCM enclosure. The heating device may be immersed in the PCM.

The electronics control system may be or comprise a battery controller. The heating device(s) may be connected to the battery controller. The heating device(s) may therefore be completely controlled and/or switched on and/or off when required. In addition, the amount of power and/or heating being delivered by the heating device may also be altered i.e. adapted and changed. The amount of heat and charge being delivered may therefore be dependent on the measurement of the sensors and/or the power required for a certain application such as supply of hot water.

In particular embodiments, the heating device may be located in the top half, one third or top quarter of the PCM enclosure. The location of the heating device may preferably be in the upper section of the PCM enclosure so that the heating device may be used to charge the top section and corresponding PCM in the top section of the PCM enclosure. Although this only heats the PCM in the upper section of the PCM enclosure and hence only provides a reduced capacity, this would still provide adequate heat for a user to access usable output. The heating device of the present invention may therefore function as a fully adaptable back-up heating system.

A further advantage of the PCM battery of the present invention is that it has been found that it is possible to input electrical heat via the heating device and then take out the heat immediately via a heat exchanger. The advantage of this is that the electric heat energy does not need to be stored unlike that found in prior art systems such as instantaneous water heater systems.

In embodiments, the PCM heat battery may comprise several electric heating devices located at different heights within the PCM enclosure. The advantage of doing this is that one can choose how much of the PCM material is heated and therefore how much energy is to be stored and/or released. By placing the electric heating device at different heights allows different amounts (i.e. volumes) of the PCM to be heated. The back-up electrical heater element function of the present invention is therefore highly adaptable in a wide range of applications such as, for example, dual port systems.

In certain embodiments, the PCM heat battery may comprise a heating device located in the upper half of the PCM enclosure and a heating device located in the lower half of the PCM enclosure. The PCM heat battery may therefore comprise two heating devices at different vertical locations. The upper located heating device may function as a back-up heater. The heating device may therefore be activated should the primary heat source fail.

Alternatively, there may be a heating device located about three quarters up into the PCM enclosure and a lower located heating device located just above the bottom of the PCM enclosure. As mentioned above, the location of the heating devices may be adapted to allow different amounts of the PCM to be heated. As previously described, the heating devices may be any suitable form of electric heaters/elements.

A heating device located towards the bottom of the PCM enclosure may allow substantially all of the PCM material in the battery to be quickly charged.

The advantage of having a second heating device located within the PCM enclosure is that this enables the PCM in the heat battery to be more quickly charged. The heating device located at the bottom of the PCM enclosure may function as the primary heat source for the heat battery.

The present invention may therefore have a plurality of integrally and/or internally located heating devices such as electric heating devices at different heights in the battery to provide different amounts of energy. By heating different amounts and volumes of the PCM provides different amounts of energy which can then be stored and/or distributed.

In further embodiments, there may be at least one or a plurality of heating device(s) which may be integral and/or internal to the PCM heat battery and which may be submersed in a PCM below, for example, a heat exchanger. Located towards the lower end of the heat battery the PCM enclosure may, for example, also comprise step features e.g. two step features which extend up from the bottom of PCM enclosure.

The step features may provide an efficient housing for, for example, heater element terminals and safety cut-off features. The step features may also allow vacuum insulation panels to be used to insulate the PCM heat battery.

These step features 503a also aid the positioning of the heat exchanger 504 above the heating device 511 and the PCM 505 volume below the heat exchanger 504.

The heating device(s) may be an electrical heating device located towards the lower end of the PCM enclosure. The heating device may, for example, be tubular in form and may be integral to the heat battery. The heating device(s) may be located below the heat exchanger. The heating device(s) may therefore be used to provide instant heating to the PCM.

The heating device (e.g. a tubular electrical heater) may penetrate the heat battery case via, for example, a bulkhead connection. Such an arrangement provides the advantage of being able to transfer heat to the PCM via a large surface area from the tubular elongate heating device.

The heating device may be submerged and fully immersed in the PCM. The heating device may therefore be in direct contact PCM.

There may also be a heat exchanger located within the PCM heat battery and located inside the PCM enclosure and PCM. Typically, the heat exchanger may have a finned core two improve thermal efficiency. The heat exchanger may have control circuits.

Conduction and convection currents in the PCM may transfer heat to the heat exchanger e.g. a heat exchanger with a finned core. This has been found to be a highly energy efficient system.

In a further embodiment, the PCM heat battery may comprise at least one or a plurality of thermal conductors such as, for example, metal rods which may be substantially vertically inserted into the heat battery case. The thermal conductors may, for example, be conducting rods or heat pipes. The thermal conductors may be located substantially vertically in the heat exchanger and extend into part of the PCM such as, for example, the upper end area of the PCM. The thermal conductors may be used to dissipate and/or spread heat throughout the heat exchanger and/or PCM.

The thermal conductors may therefore be immersed or at least partially immersed in the PCM. The thermal conductors may also extend or at least partially extend into a heat exchanger e.g. a heat exchanger core which may be finned.

At least one or a plurality of heating devices may be located towards the lower end of a heat exchanger. The heating devices may be substantially horizontally located towards and along the bottom of the PCM enclosure.

In a further embodiment, the PCM heat battery may comprise thermal plates (e.g. conducting thermal plates such as metal plates) which may be integrated into the PCM heat battery design. The thermal plates may extend into or at least partially into the heat exchanger core (e.g. a heat exchanger finned core). The thermal plates may extend into a heated zone of the heat battery below or substantially below the heat exchanger.

For example, there may be two, three, four or a plurality of thermal plates. The thermal plates may be located substantially vertically in the heat exchanger and optionally extend into the lower end area of the PCM 705 and through the heating device. There may be any suitable number of thermal plates which may be oriented in any suitable orientation through the heat exchanger. It has been found that it is preferred that the thermal plates may be entered substantially vertically to aid the transfer of heat upwards and cooling downwards along the plates.

The thermal plates may be formed from a conducting thermal material such as any suitable metal and/or alloy. The plates may be relatively thick to aid the heat transfer. The thermal plates may be substantially planar and oriented substantially vertically in the PCM heat battery.

The thermal plates may be relatively thick such as about 0.1-5 cm thick, about 0.1-2 cm thick or about 0.1-0.5 cm thick.

In a further embodiment, the PCM heat battery may comprise non-planar heating devices such as, for example, at least one or a plurality of substantially L-shaped electrical heating devices embedded in the heat exchanger e.g. a heat exchanger finned core.

The non-planar heating devices (e.g. substantially L-shaped heating devices) may comprise a substantially vertical located portion which extends down through the PCM. Extending tangentially from the substantially vertical portion 811a there may be one or a plurality (e.g. three) substantially horizontally located portions. There may be any number such as a single or a plurality of substantially vertically located portions and substantially horizontally located portions.

One substantially horizontally located portion may extend in the lower quarter of the heat exchanger core, the second horizontally located portion may extend substantially through the middle portion of the heat exchanger core and the third horizontally located portion may extend through the upper quarter of the heat exchanger. The horizontally located portions may be located in any suitable area of the heat exchanger core.

The substantially horizontally located portions may embedded or at least partly embedded into the core of the heat exchanger (e.g. the finned core of a fin tube heat exchanger). The heat exchanger may preferably be all or at least partially submersed in the PCM.

The substantially horizontally located portions of the heating device may be placed at specific heights within the heat exchanger core (e.g. a finned core) depending on the heat batteries footprint and aspect ratio to give better performance regarding, even charging, time to charge, partial draw offs and expansion characteristics.

The positioning of the substantially horizontally located portions of the heating device have been found to lessen the following issues:
  a) Excessive local pressure which can damage the battery cell case;
  b) Rapid overheating of PCM above its safe working limits
  c) Overheating of heating device resulting in its reduced life span or failure.

It has been found in the PCM heat battery it is preferred to have an interference fit between the heating element and parts of the heat exchanger core such as the heat exchanger fins. This has surprisingly been found to provide an increased heat transfer surface with improved charge times.

The 'L' shaped heating devices with the substantially horizontal portions has also been found to provide a number of advantages such as:
  1) Relief for any expansion of the PCM during its phase change (melting and freezing); and 2) A simple termination of the cables required for operation of the heat battery at the top of the PCM heat battery.

In a further embodiment, the PCM heat battery may comprise at least one or a plurality of heating devices (e.g. electrically heated tubular heaters) which may be embedded into a heat exchanger core which may optionally comprise metal conducting elements e.g. conducting tubes such as copper tubes.

The at least one or a plurality of heating devices may be electrical heating devices. In particular, the heating devices may comprise a portion of the electric heating device which may be located in an upper portion of the heat battery between the PCM enclosure and the heat exchanger core. In particular, the at least one of a plurality of electric heating devices may be embedded in a manifold of the PCM heat battery.

The heating device may also be embedded in a circuit e.g. a skipped circuit row. The circuit may extend substantially horizontally across the heat exchanger core.

There may be any number of skipped circuit rows extending across the heat exchanger core. For example, there may be a second skipped circuit row extending substantially horizontally across the heat exchanger core.

The skipped circuit rows may therefore be embedded in the heat exchanger. There may also be a passageway which may, for example, be a tube for the heat exchange. The passageway 920 may extend around the circuit which may, for example, be a skipped circuit row. Extending around the skipped circuit row there may a heating device. The electrical heater may therefore embedded be into a heat exchanger and, in particular, in passageways (i.e. tubes which may be made from copper or any other suitable conductive material) extending through the heat exchanger core. The heating devices may be embedded into the heat exchanger core and preferentially and optionally not into the PCM directly. There are a number of different options in which to embed the heating devices.

The heating devices may therefore be directly in contact with the heat exchanger and thus an improved and consistent heat transfer is achieved. Additionally, the heating devices (e.g. heating elements) may optionally never in this embodiment be in direct contact with the PCM and thus they do not need to be compatible with the PCM. This leads to more options for heaters with reduced costs and increased reliability and robustness. The heater elements will be accessible for servicing and maintenance without exposure of the servicing personnel to the PCM. Higher power elements may be used and the PCM operating conditions are not of concern from the higher power surface loading of the heater.

In a further embodiment, the PCM heat battery may comprise at least one or a plurality of heating devices which may be embedded and/or located in a housing containing material which is efficiently able to transfer and/or spread heat. The material therefore allows for better transfer of heat from the heating device to the heat exchanger core and/or phase change material.

In this embodiment, the heating device (e.g. an electric heating device) may be located towards the lower end of the PCM enclosure and underneath the heat exchanger core (e.g. a heat exchanger finned core). There may be a first heat exchanger circuit (heat exchanger circuit 1) and a second heat exchanger circuit (heat exchanger circuit 2).

The heating device may also be optionally located between two step features and typically extend between these two step features. The step features may be part of the PCM enclosure.

The heating device may be held within a housing which may be filled with a material/fluid capable of transferring and/or spreading heat evenly. The material/fluid may, for example, be any form of suitable oil and/or thermal paste.

Typically, the heating device may be, for example, a tubular electrical heating device which may be located within the housing and surrounded by the material which is able to efficiently transfer and/or spread heat. The housing may therefore be filled with oil and/or thermal paste.

The housing in some embodiments may be finned to improve heat transfer and in other embodiments may not be finned depending on the particular heat and energy requirements.

The heating device may therefore be embedded in a housing which may be filled with thermal material capable of transferring and/or spreading heat evenly. The housing may preferably be integral to the PCM enclosure. The heating device typically does not interface with the PCM.

The housing can either be plain or optionally finned to increase surface area and heat transfer from the heater to thermal material to housing and then the PCM but importantly reduce the surface loading of the heating device leading to a robust design with reduced service intervals. This has been found to be a significant technical advantage and increasing the lifetime of the PCM heat battery.

Utilising an oil bath in the housing means that the heating device does not need to have a high tolerance fit within the housing as required by cartridge heaters. Often both the heating device and housing may preferably be machined/specified appropriately to provide the heat transfer (through an interference fit) and be tapered to enable the heating device to be easily removed. This again is a further advantage of the present design.

The design of the heating device and housing means that the heating device may be easily removable and accessible by service personnel without exposure to the PCM. The small volume of thermal material such as the oil is replaced during the service interval via an oil nipple in the housing. The heat battery may therefore be very easily serviceable which is a further technical advantage.

The fins on the housing may simply be extended elongate plates which function as heat dissipation areas to increase surface area and hence transfer and/or spread heat energy.

In a further embodiment, the PCM heat battery may comprise at least one or plurality of heating devices may be located externally to the PCM enclosure. Furthermore, there may be, for example, a conductive block within which a current may be induced via an external induction heater.

The heating device may be located towards the lower end of the PCM enclosure and typically underneath (i.e. substantially below) the heat exchanger core (e.g. a heat exchanger finned core). Preferably, the heating device may be externally located outside of the PCM enclosure and at or towards the bottom of the PCM enclosure. The heating device may therefore be located in between the bottom of the PCM enclosure and the bottom of the battery case. In particular embodiments, the heating device may be an induction heater.

The heating device may therefore be described as being externally located from the heat exchanger core and the PCM. The heating device is still internal of the PCM heat battery.

Located above or substantially above the heating device and inside the PCM enclosure there may be a layer of conductive material which may extends along the bottom or substantially along the bottom of the PCM enclosure. The function of the conductive material may be to inductively transfer heat from the heating device which may be an inductive heater. The conductive material may therefore be in the form of a heat conductive metal and/or alloy block within which a current may be induced to produce and/or transfer heat.

In a further embodiment, the PCM heat battery may comprise at least one or a plurality of removable cartridge heating devices comprising an internally immersed conductive block.

The conductive block may be made from any suitable conductive material and may extend along the bottom of the PCM enclosure and may optionally be located underneath (i.e. below) the heat exchanger core and the PCM.

The conductive block may extend completely or substantially or at least partially along from one side of the PCM enclosure to the other side. The conductive block may be comprised of conductive material such as any suitable metal and/or alloy. The conductive block is therefore meant to transfer heat efficiently from inside the bottom of the PCM enclosure where heating devices may be located.

Internally embedded within the conductive block there may be at least one or a series of cartridge heating devices which may be removable. The cartridge heating devices may extend substantially horizontally along and preferably within the block.

The cartridge heating devices may therefore be internally located within the PCM enclosure. The cartridge heating devices may therefore comprise a heat conductive metal and/or alloy block which is capable of efficiently transferring heat.

The conductive block may therefore function as a heat source embedded at the bottom of and inside the PCM enclosure. The conductive block typically has a large surface area compared to the embedded cartridge heating devices.

A technical advantage of the cartridge heating devices is that these are accessible externally and thus easily removable as they are not in contact with the PCM.

Preferably, the conductive block may be in the form of a heater block embedded at the bottom of the PCM enclosure.

In a further embodiment, the PCM heat battery may additionally comprise an impeller agitator which mixes the PCM and aids heat transfer via forced convection. The addition of the impeller agitator therefore provides the following technical advantages:
    Aiding heat transfer via forced convection
    Agitating and mixing the PCM and its constituent components In addition, the PCM heat battery may therefore comprise a stirrer which may be any form of stirring device such as a rotating agitator. The stirrer may, for example, be located towards the bottom of the PCM enclosure and may be used to stir the PCM to improve the efficiency of the heat battery and heat transfer.

In a further embodiment, the PCM heat battery may comprise heating devices extending substantially vertically inside the PCM enclosure. The heating devices may be in the form of heater element networks.

The heating devices in the form of heater element networks may be in the form of a grid-like pattern. There may therefore be grid sections within which there may be tubular sections which provide efficient heat transfer. The tubular sections may, for example, be metal tubes e.g. copper tubes.

The heating devices may also comprise distending members (e.g. fins) which may replace the usual fins found in heat exchangers. In particular embodiments, positive temperature coefficient (PTC) heaters may be used which may be slid onto heat transfer tubes such as copper tubes replacing the standard fins found in heat exchangers.

In a further embodiment, the PCM heat battery may comprise heating devices in the form of substantially vertically oriented low powered vertical heaters in the form of, for example, heat pipes or conduction rods to aid PCM circulation. This has been found to create a pumping action for the PCM material within the heat battery.

The arrangement has been found to have a number of technical advantages such as:
1) Increasing the heat transfer from the base of the heat battery up the core optimising charge times; and
2) Creating paths for the melted PCM to travel, relieving any pressure build up caused by the phase change and expanding PCM.

The heating device may be located towards the bottom of the PCM enclosure. The heating device may extend substantially across the bottom of the heat exchanger.

Typically, there may be a plurality of substantially vertically oriented low powered vertical heaters. The substantially vertically oriented heaters may be in the form of low powered heating devices or alternatively heat tubes. There may be any suitable number of substantially vertically oriented heaters.

The substantially vertically oriented heaters may extend from the upper surface of the PCM enclosure through the PCM and into the heat exchanger.

In a further embodiment, the PCM heat battery may comprise louvred fins. The louvred fins may comprise a series of tubes (e.g. copper tubes) which may be used to transfer heat. Within and around the tubes PCM material may flows. The flow of PCM material may be directed using the louvers in the fins. The fins may therefore comprise a louver which can in effect be fully opened so that it is completely planar or switched into an angular form so that it can be used to direct the flow of PCM material. The louvred fin design may be incorporated into any of the embodiments and heat batteries described above.

According to a third aspect of the present invention there is provided a method of applying thermal energy to a PCM heat battery comprising:
    providing a PCM enclosure capable of holding PCM;
    providing PCM located in the enclosure;
    providing an electronics control system for the PCM heat battery;
    providing at least one or a plurality of heating devices located in the PCM enclosure and immersed in the PCM;
    wherein the at least one or a plurality of heating devices are capable of heating and/or charging the PCM.

The features described above may be used in any combination with any of the embodiments described in this application.

The method may use any of the features described in the first and second aspect.

DESCRIPTION OF THE FIGURES

Embodiments of the present invention will now be described, by way of example only, with reference to the following Figures in which:

FIG. 6b represents an expanded cross-sectional view of the thermal conductor shown in FIG. 6a;

DETAILED DESCRIPTION

Generally speaking, the present invention relates to improved heat battery designs wherein the heat battery(s) are PCM heat batteries with, for example, at least one or a plurality of heating devices which may be internally located.

The heating devices in the present invention may be integrally and/or internally located electrical heating device(s). The heating devices may therefore in some embodiments be in direct contact with the PCM material.

In the present invention, the PCM may therefore in some embodiments be directly heated meaning that the circulation of fluids in circuits in the battery is not essential for the charging phase and is only present for the discharging of the heat battery. The present invention also overcomes the need for complex hydronic circuits.

Figure 1:
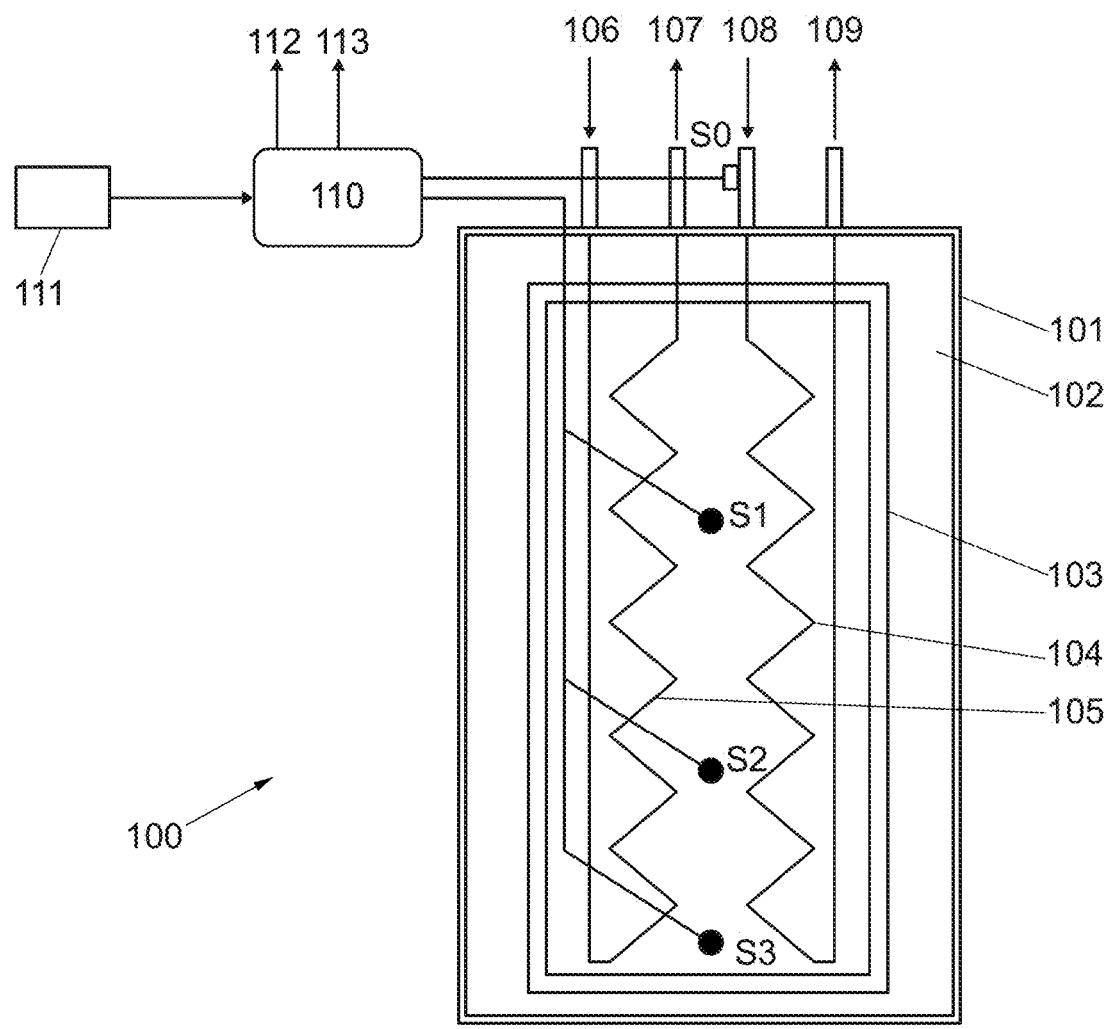
FIG. 1 is a schematic representation of a dual port heat battery design according to the prior art.

FIG. 1 shows a prior art heat battery design generally designated 100. The heat battery 100 shown is a dual port heat battery.

As shown in FIG. 1 there is a heat battery case 101. Located within the heat battery case 101 there is insulation material 102. Located within the insulation material 102 there is a PCM enclosure 103 which is used to contain the PCM of the heat battery 100. The insulation material 102 forms a jacket and insulating layer around the PCM enclosure 103.

Also shown in FIG. 1 there is a low power circuit (LPC) 104 and a high power circuit (HPC) 105 which are used to provide an electrical connection for the heat battery 100.

At the top of the heat battery 100 there is also shown an HPC inlet 106 and an HPC outlet 107. There is also shown an LPC inlet 108 and LPC outlet 109.

FIG. 1 also shows that there is a battery controller 110, a mains power supply (CC) 111, a battery charge status signal 112 and a battery charging control signal 113.

In the heat battery 100 there is also an overheat safety cut-off thermostat SO and temperature sensors S1, S2 and S3.

Where there is a need to 'heat/charge' the heat battery 100 a working fluid (water) is circulated through pipes of a heat exchanger transferring the thermal energy from the working fluid to the PCM which is located within the PCM enclosure 103. This requires a supplementary hydronic assembly/circuit with pump, temperature and flow sensors etc. This is the technical solution used in the prior art and brings many disadvantages. The present invention addresses these problems and overcomes the need for such complex hydronics.

There is therefore a need in the field to provide an improved heat battery arrangement and design which provides improved technical efficiencies, benefits and especially flexibility for connecting multiple charging heat sources. This includes the ability to still be charged with an external primary heat source and/or by an internal heating device(s) in a controlled manner without the need for complex hydronic circuits. A prior art design with complex hydronic circuits is shown schematically in FIG. 2.

Figure 2:
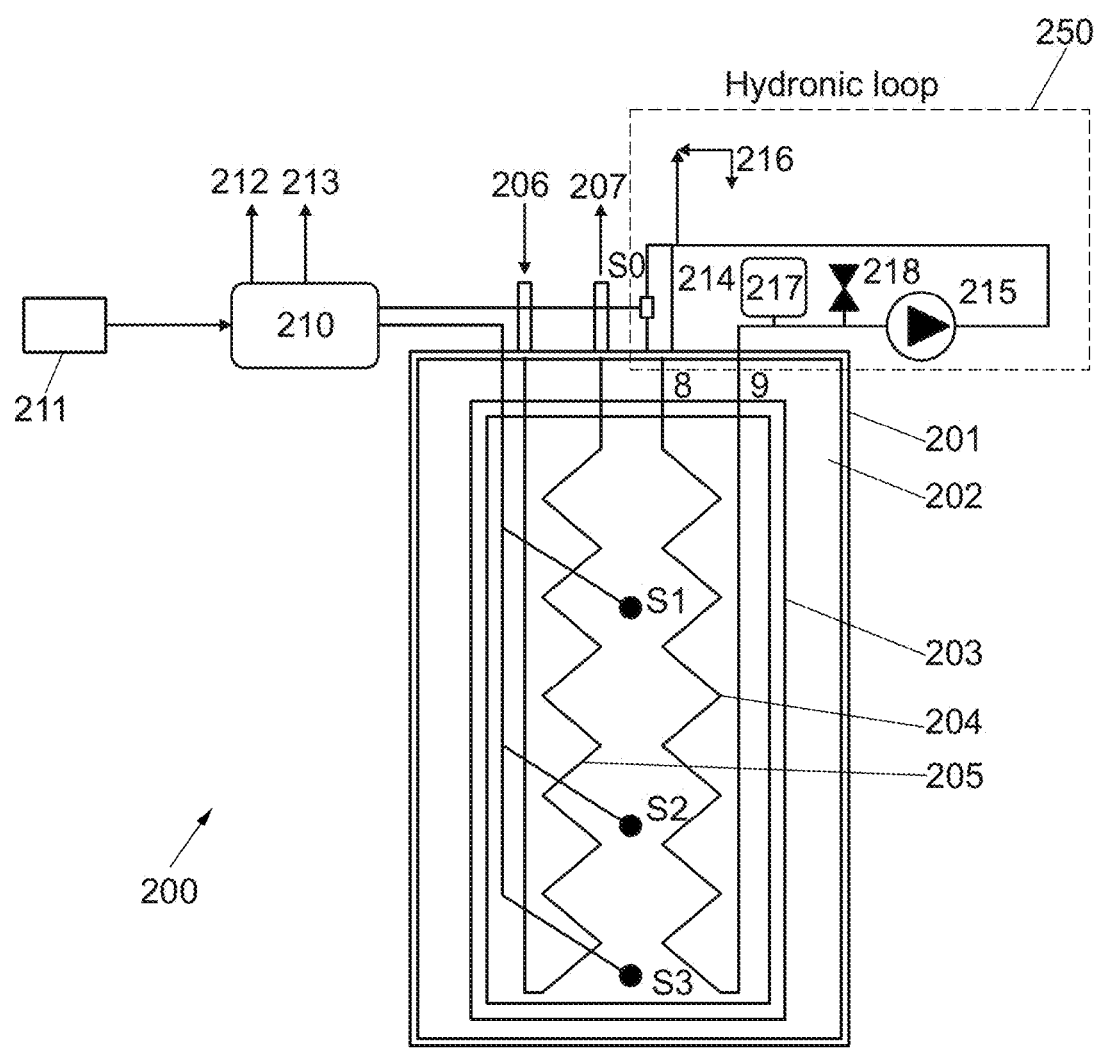
FIG. 2 represents a dual port heat battery according to an embodiment of the present invention with a hydronic circuit for charging the heat battery by an electric heater according to the present invention.

FIG. 2 is a further heat battery 200 design. Similar, to the heat battery 100 shown in FIG. 1, there is a heat battery case 201, insulation 202, a PCM enclosure 203, a low power circuit (LPC) 204, a high power circuit (HPC) 205, an HPC inlet 206, an HPC outlet 207, and LPC inlet 208, and LPC outlet 209, a battery controller 210, a mains power supply (CC) 211, a battery charge status signal 212 and a battery charging control signal 213.

The battery 200 shown in FIG. 2 also comprises an electric heater 214 located at the top of the battery 200. There is also a pump 215, an expansion release valve (ERV) 216, an expansion vessel 217 and a system filling arrangement 218. The heat battery 200 therefore comprises a hydronic loop 250.

The battery 200 therefore shown in FIG. 2 is a dual port heat battery hydronic electric heating arrangement.

The independent hydronic circuits referred to above and shown in FIG. 2, is suitable for batteries with single or multiple (dual) hydronic circuits. Under conditions where heat battery charging circuit is designed for potable water, then, this hydronic circuit and the components in this circuit must be certified to water regulations adding to costs and complexity.

To omit these types of hydronic circuits and any associated components and associated capex/opex costs, an arrangement whereby there are integrally and/or internally located heating devices (e.g. electrical heating devices) is set out in the present application for a range of heat batteries containing PCM.

Thus, directly heating the PCM means the circulation fluids in either hydronic circuits is not essential for the charging phase and is therefore only required for the discharging of the heat battery. By directly heating the PCM provides a number of technical advantages and overcomes a number of known problems with hydronic systems:

1. Scaling issues—it has been found that scaling up heater elements in prior art heat batteries can lead to heat failure.
2. In prior art designs of the control of the heater has been found problematic whereas in the present invention the heater is exposed to a PCM which can be controlled and made to any bespoke form for a range of specific requirements.
3. In prior art designs wherein, the heater is in the flow of the working fluid this has been found to add to system pressure drops. It may also affect charging flow rates and hinder them.
4. The present invention uses PCM's which have a higher boiling temperature than water which is used in prior art designs.

The heat battery 200 shown in FIG. 2 is a step forward from the heat battery 100 shown in FIG. 1. The heat battery 200 is therefore a step forward from the old single port design because of the ability to charge and/or discharge off different circuits. This gives a very flexible solution.

A dual port heat battery design provides the ability to charge the heat battery with non-potable water (using, simple cheap, non-certified components) and then extract the heat with potable water, with no additional components.

Each of the ports in a 'dual port heat battery' can be sized appropriately. For example, the heat battery can be split 50%-50% or 70%-30% so that you can assign a larger proportion for discharging than charging.

This enables you to charge slowly over longer periods of time but discharge with high power and higher flow rates.

The present invention provides a further improvement over the heat batteries shown in FIGS. 1 and 2.

Figure 3:
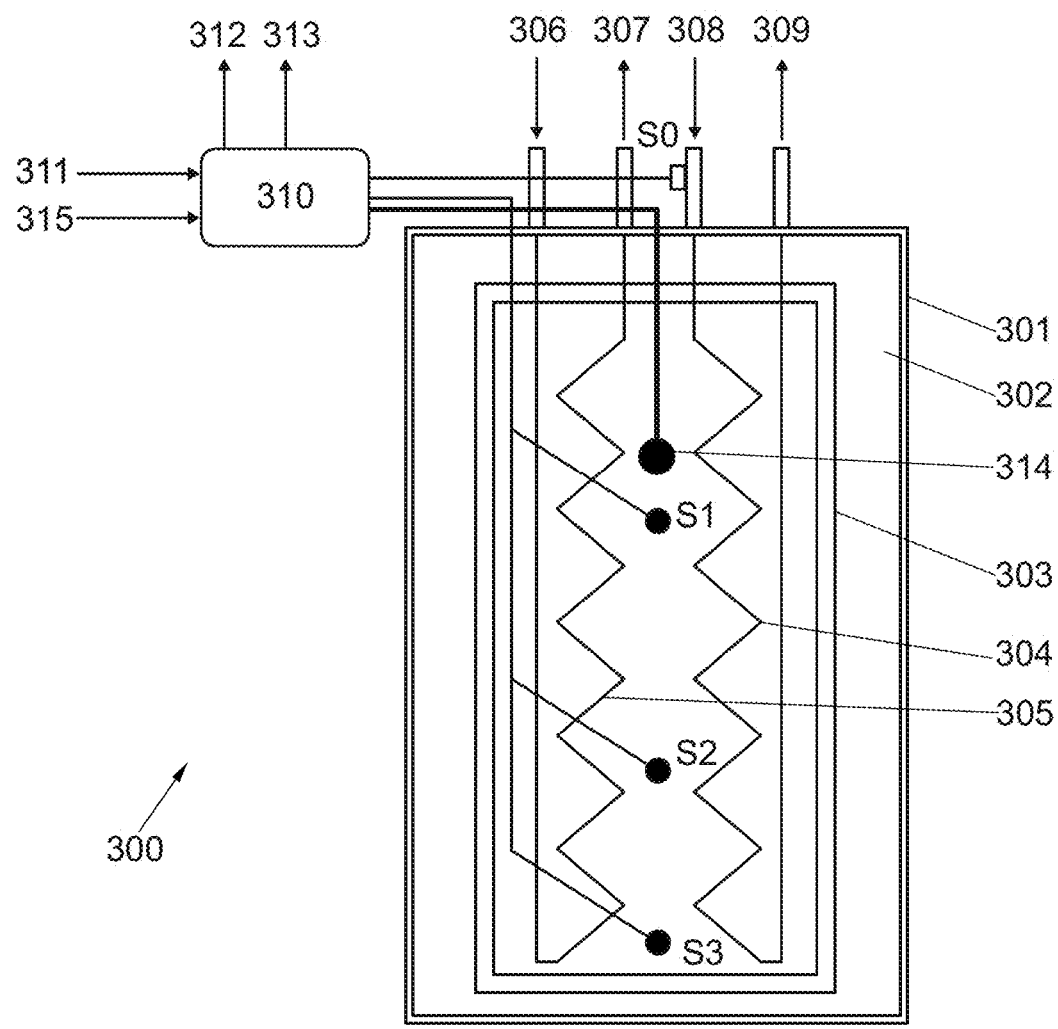
FIG. 3 represents a heat battery according to an embodiment of the present invention where there is a dual port with a back-up electrical heater element.

FIG. 3 represents a heat battery 300 according to the present invention. The heat battery 300 is of a dual port design with a back-up heater element e.g. an electrical heater element. There may be at least one or a plurality of back-up heater elements. This is described in more detail below.

The dual port design of the present invention provides the technical advantage of being able to charge the heat battery with non-potable water. Moreover, the battery can be charged with simple and cheap, non-certified components. The heat may then be extracted with potable water. The heat battery of the present invention is therefore much improved over previous complex hydronic systems.

The heat battery 300 comprises a heat battery case 301 which acts as an enclosure for all of the heat battery 300 components. Located within the heat battery case 301 there is an insulation layer 302. The insulation layer 302 acts a thermal insulator to improve efficiency of the heat battery 300. The insulation layer 302 forms an insulation jacket. The insulating layer 302 may be made from any suitable insulating material.

Located within the insulation layer 302 there is a PCM enclosure 303. Within the PCM enclosure 303 there is a PCM. The specific PCM used may be adapted and made bespoke for the specific purpose required. The heat battery 300 of the present invention is therefore highly adaptable and can be modified for a wide range of applications.

FIG. 3 also shows that the heat battery 300 comprises a low power circuit (LPC) 304 and a high power circuit (HPC) 305.

On the upper surface of the heat battery 300 and as shown in FIG. 3 there is an HPC inlet 306 and an LPC outlet 307.

On the upper surface of the heat battery 300 there is also an LPC inlet 308 and an LPC outlet 309.

FIG. 3 also shows that there is a battery controller 310 which is connected to a mains power supply (CC) 311. There is also a battery charge status signal 312 and a battery charging control signal 313.

There is also shown and overheat safety cut-off thermostat SO and temperature sensors S1, S2, S3. There may be at least one temperature sensor or a plurality of temperature sensors. The temperature sensors may be distributed throughout the heat battery to obtain a temperature across the whole working medium.

The heat battery 300 also comprises a heating device 314 which may, for example, be a standby electric heater which is located in the PCM as shown in FIG. 3. This feature is directed to a significant difference to the heat battery shown in FIGS. 1 and 2. The heating device 314 may be any form of electric heating device which may be located in the PCM. The heating device 314 may therefore be described as being an integrally and/or internally located electrical heating device which is immersed in the PCM. It should be noted that the present invention may have at least one, two or a plurality of heating devices located in the PCM.

It has been found that the location of the heating device 314 in the PCM enclosure 303 and therefore the PCM has been found to be important.

The heat battery 300 also comprises a power supply 315 for the heating device 314.

As shown in FIG. 3, the electric heater 314 is located in the upper half of the PCM enclosure 303. By upper half we mean in the vertical upper half of the PCM enclosure 303. The electric heater 314 will also be immersed in the PCM material.

The heating device 314 is connected to the battery controller 310. The heating device 314 may therefore be completely controlled and/or switched on and/or off when required. In addition, the amount of power and/or heating being delivered by the heating device 314 may also be altered and changed.

In preferred embodiments, the heating device 314 is located in the top half, one third or top quarter of the PCM enclosure 303. The location of the heating device 314 is preferably in the upper section of the PCM enclosure 313 so that the heating device 314 may be used to charge the top section and corresponding PCM in the top section of the PCM enclosure 303. Although this only heats the PCM in the upper section of the PCM enclosure 303 and hence only provides a reduced capacity, this would still provide adequate heat for a user to access usable output. The heating device 314 of the present invention may therefore function as a fully adaptable back-up heating system.

A further advantage of the system shown in heat battery 300 is that it has been found that it is possible to input electrical heat via the heating device 314 and then take out the heat immediately via a heat exchanger. The advantage of this is that the electric heat energy does not need to be stored unlike that found in prior art systems such as instantaneous water heater systems.

Although not shown in FIG. 3, the heat battery 300 may comprise several electric heating devices located at different heights within the PCM enclosure 303. The advantage of doing this is that one can choose how much of the PCM material is heated and therefore how much energy is to be stored and/or released. By placing the electric heating device at different heights allows different amounts (i.e. volumes) of the PCM to be heated. The back-up electrical heater element function of the present invention is therefore highly adaptable in a wide range of applications such as, for example, dual port systems.

Figure 4:
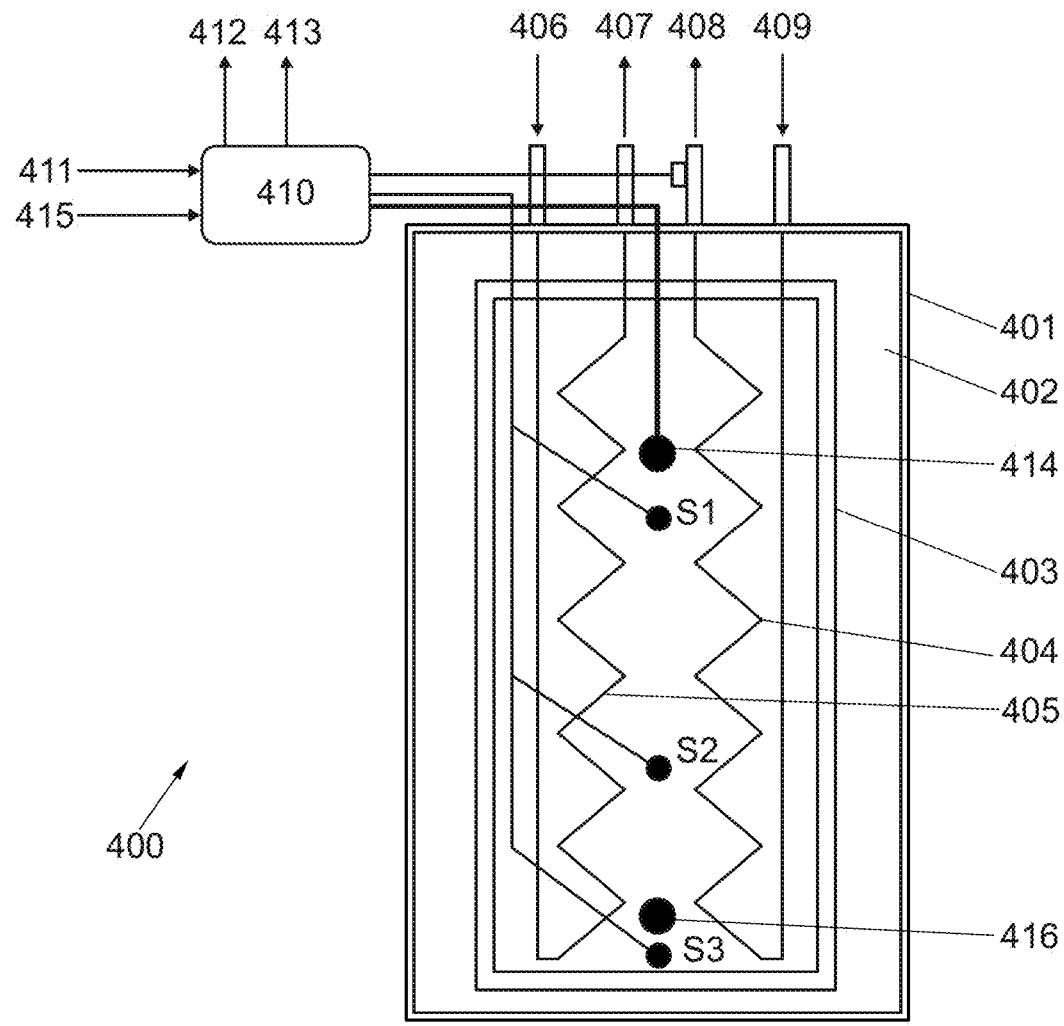
FIG. 4 represents a heat battery according to a further embodiment of the present invention where there is a dual port with an electrically heated heat battery with two heating devices.

The heat battery 400 shown in FIG. 4 is very similar to the heat battery 300 shown in FIG. 3. The difference is that the heat battery 400 in FIG. 4 has two heating devices: heating device 414 and heating device 416.

The heat battery 400 comprises: a heat battery case 401; an insulation layer 402; a PCM enclosure 403; a low power circuit (LPC) 404; a high power circuit (HPC) 405; an HPC inlet 406; an HPC outlet 407; an LPC outlet 408; an LPC inlet 409; a battery controller 410; a mains power supply (CC) 411; a battery charge status signal 412; a battery charging control signal 413; an upper located electric heater 414; a power supply 415 for the electric heaters and a lower located electric heater 416.

There is also shown and overheat safety cut-off thermostat S0 and temperature sensors S1, S2, S3.

The battery 400 therefore comprises a first heating device 414 located in the upper half of the PCM enclosure 403 and a second heating device 416 located in the lower half of the PCM enclosure 403.

As shown in FIG. 4, the heating device 414 is located about three quarters up into the PCM enclosure 414 and the lower located heating device 416 is located just above the bottom of the PCM enclosure 403. As mentioned above, the location of the heating devices may be adapted to allow different amounts of the PCM to be heated. As previously described, the heating devices may be any suitable form of electric heaters/elements.

The upper located heating device 414 may function as a back-up heater as described in FIG. 3. The heating device 414 may therefore be activated should the primary heat source fail.

The lower located heating device 416 may be used along a primary heating system. As the heating device 416 is located towards the bottom of the PCM enclosure 403 this allows substantially all of the PCM material in the battery 400 to be quickly charged.

The advantage of having the second heating device 416 is that this enables the PCM in the heat battery 400 to be more quickly charged. The heating device 416 located at the bottom of the PCM enclosure 403 may function as the primary heat source for the heat battery 400.

Further to the embodiment shown in FIG. 4, the present invention may therefore have a plurality of integrally and/or internally located heating devices such as electric heating devices at different heights in the battery to provide different amounts of energy. By heating different amounts and volumes of the PCM provides different amounts of energy which can then be stored and/or distributed.

With the embodiments shown in FIGS. 3 and 4 this has been found to provide a number of technical benefits including the ability for the heat battery to still be charged with an external primary heat source, eliminating the requirement to have complex hydronic circuits. This also provides the ability for the heat battery to be charged by external sources and at least one or a plurality of internal heating devices in a controlled manner. The at least one or a plurality of internal heating devices may be located at a variety of vertical locations which provides the ability to heat different amounts of the PCM and hence store and/or discharge different amounts of energy.

The present applicant has therefore developed a heat battery design whereby an integral and/or internally located heating device such as an electrical heating device or a plurality of electric heating devices offers a number of distinct technical advantages.

The heat battery of the present invention with an integrated and/or internally located electric heating device or a plurality of integrated heating devices provides advantages such as:

a) The heat battery can still be charged by an external primary heat source (e.g. a boiler) and in this application, the electric heater acts as a back-up (secondary) source of heat should the primary source fail.

b) Secondly as shown in FIG. 4, the integrated electric heater acts as the main/primary heat source and heats the battery directly, thus omitting the requirement for complex hydronic circuits.

c) The heat battery can also be charged by both external heat sources and the internal heating device in a controlled manner. For example, by solar PV via ab electric element and top-up heating by boiler via hydronic circuit.

d) The heating device is surrounded by PCM i.e. an environment with constant and known parameters. In hot water cylinders, the heating devices are surrounded by potable water and therefore limescale builds on the heating element resulting in hot spots and eventually failure of heating device. When the heating device is located in the PCM, as in the present invention, these issues do not arise and therefore the heating device will have long service life.

e) Unlike a water cylinder, the heat battery of the present invention with a heating device located at the bottom can be charged to different levels. For example, a heating device may only be switched on until 50% of the PCM is melted and so on. Therefore, the charge state can be controlled without using multiple elements at different heights.

Several variations/iterations have been designed and evaluated as detailed below and shown schematically in FIGS. 5 to 15. Each of the Figures have slightly different configurations for the components of the apparatus leading to a variety of technical benefits. This is discussed below.

Figure 5:
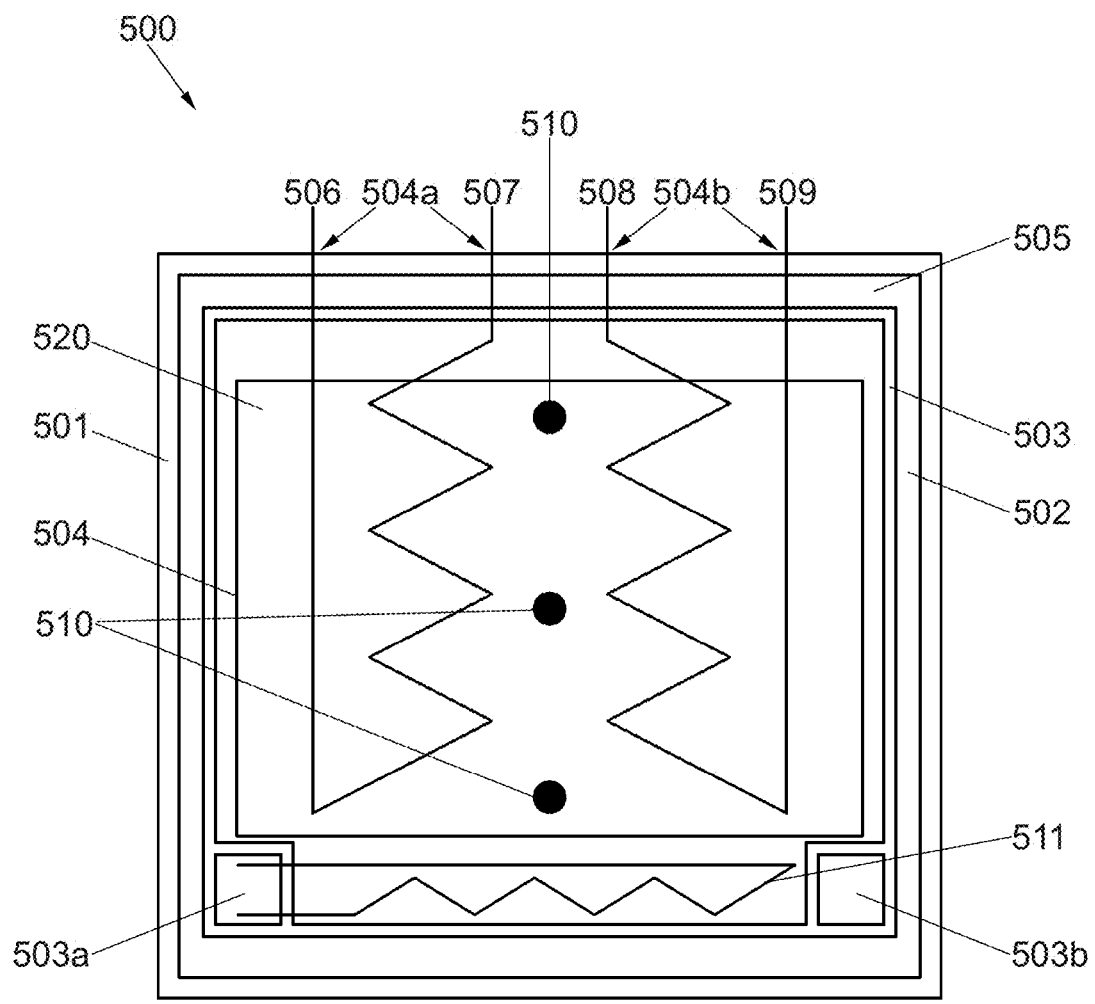
FIG. 5 represents a heat battery according to a further embodiment of the present invention where there is an electrical heater integral to the heat battery submersed in a PCM below a heat exchanger.

FIG. 5 represents a heat battery 500 according to the present invention wherein there is heating device such as an electrical heater integral and/or internal to the heat battery submersed in a PCM below, for example, a heat exchanger.

As shown in FIG. 5, there is a heat battery case 501 with an insulation layer 502 located inside the heat battery case 501. Located inside the insulation layer 502 there is a PCM enclosure 503. The insulation layer 502 forms a jacket around the PCM enclosure 503 holding PCM 505.

There is also a heat exchanger 504 and a heat exchanger core 520.

As shown in FIG. 5, located towards the lower end of the heat battery 500 the PCM enclosure 503 has two step features 503a which extend up from the bottom of PCM enclosure 503.

FIG. 5 also shows that there is a heat exchanger 504 which may have a finned core to improve thermal efficiency. There is also shown a heat exchanger circuit 504a and a heat exchanger circuit 504b.

Located inside the PCM enclosure 503 there is a PCM 505.

Located on the upper side of the PCM enclosure 503 there is an inlet 506 (e.g. inlet circuit 1), an outlet 507 (e.g. circuit 1), an inlet 508 (e.g. circuit 2) and an outlet 509 (e.g. circuit 2).

There are also sensors 510. As shown in FIG. 5 there are preferably three sensors 510. A first sensor is located towards the upper end of the PCM enclosure 503, a second sensor is located in about the middle of the PCM enclosure 503 and a further sensor is located towards the lower end of the PCM enclosure 503. There may therefore be a plurality of different sensors 510 located at different vertical locations in the PCM enclosure 503. This allows the physical parameters such as the temperature of the PCM to be measured and/or recorded at different heights and throughout the whole body of the PCM material.

Importantly, FIG. 5 also shows that there is a heating device 511 such as an electrical heating device located towards the lower end of the PCM enclosure 503. The heating device 511 may be tubular in form and may be integral to the heat battery 500.

The heating device 511 is located below the heat exchanger 504.

There is also a heat exchanger circuit 504a (heat exchanger circuit 1) and a heat exchanger circuit 504b (heat exchanger circuit 2).

The heating device 511 may therefore be used to provide instant heating to the PCM 505.

As shown in FIG. 5, the heating device 511 (e.g. a tubular electrical heater) may penetrate the heat battery case 501 via, for example, a bulkhead connection.

Moreover, the heating device 511 is submerged and fully immersed in the PCM 505. The heating device 511 is therefore in direct contact PCM 505.

FIG. 5 provides the technical advantage that heat is transferred to the PCM 505 via a large surface area from the heating device 511. Conduction and convection currents in the PCM 505 transfer the heat to the heat exchanger 504 e.g. a heat exchanger with a finned core. This has been found to be a highly energy efficient system.

The step feature 503a is part of the PCM enclosure 503 and is present, on for example, both sides of the PCM enclosure 503. There may therefore be two step features 503a or any suitable number.

The step features 503a provide an efficient housing for, for example, heater element terminals and safety cut-off features. The step features 503a may also allow vacuum insulation panels to be used to insulate the heat battery 500.

These step features 503a also aid the positioning of the heat exchanger 504 above the heating device 511 and the PCM 505 volume below the heat exchanger 504.

The present inventors have also found the following aspects according to the present invention. It has been found that when a heat battery is cold (i.e. in a discharged mode), the PCM is in solid state and it has low thermal conductivity. In this condition, if a heating device is switched on, then, it will melt the PCM surrounding it (i.e. this will form an expanding liquid pool surrounded by solid PCM) creating:

a) Excessive local pressure which can damage the battery cell case;
  b) Rapid overheating of PCM above its safe working limits; and
  c) Overheating of heating device resulting in its reduced life span or failure.

To overcome these issues two main methods were investigated and deployed:

a) Reduce the power input i.e. slow down the heat transfer process to match the heat transport characteristics of the PCM/heat exchanger core. This option was not pursued further because the battery charging times were not acceptable;
  b) A number of metal rods, inserted vertically as shown in FIG. 5a below, created a path for expanding PCM volume to escape towards a top expansion space and thus preventing localised pressure building and also increasing the convective heat transfer between a heating device and a heat exchanger/PCM core. This methodology was optimised enabling full power heat transfer;
  c) Rather than using metal rods as above—Integrating thin plates within a finned core of a heat exchanger design, which extend into the heated zone of the heat battery beneath the heat exchanger as shown in FIG. 5b; and
  d) Using louvred fins to enable the transfer of PCM between fins aiding the heat transfer through convection and allowing more channels for PCM expansion.

Figure 6A:
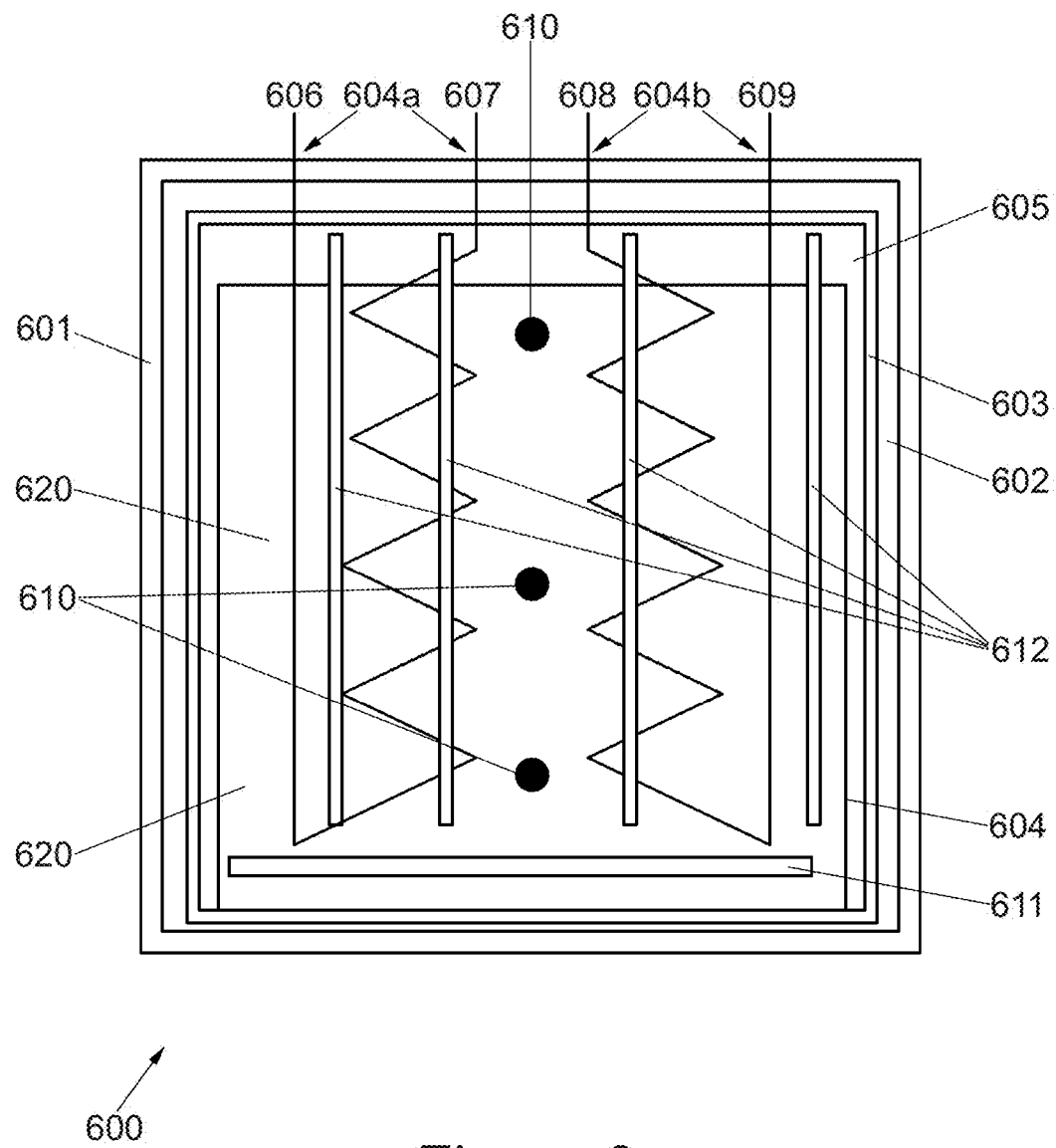
FIG. 6a represents a heat battery according to a further embodiment of the present invention where a number of thermal conductors such as heat conducting rods or heat pipes are substantially vertically inserted into a heat battery case.

FIG. 6a represents a heat battery 600 where a number of thermal conductors such as, for example, metal rods are substantially vertically inserted into the heat battery case. This is described below.

As shown in FIG. 6a, there is a heat battery 600 with a heat battery case 601 and an insulation layer 602 located inside the heat battery case 601. There is also a PCM enclosure 603.

FIG. 6a also shows that there is a heat exchanger 604 which may, for example, be a heat exchanger finned core. The heat exchanger has a core 620. FIG. 6a also shows that there is a heat exchanger circuit 604a (heat exchanger circuit 1) and a heat exchanger circuit 604b (heat exchanger circuit 2).

Located inside the PCM enclosure 603 there is a PCM 605.

Located on the upper side of the PCM enclosure 603 there is an inlet 606 (e.g. inlet circuit 1), an outlet 607 (e.g. circuit 1), an inlet 608 (e.g. circuit 2) and an outlet 609 (e.g. circuit 2).

There are also sensors 610. As shown in FIG. 6a there are preferably three sensors 610. The first sensor is located towards the upper end of the PCM enclosure 603, a further sensor located in about the middle of the PCM enclosure 603 and a further sensor is located towards the lower end of the PCM enclosure 603.

FIG. 6a also shows that there is a heating device 611 located towards the lower end of the heat exchanger 604. The heating device 611 may be substantially horizontally located towards and along the bottom of the PCM enclosure 603.

FIG. 6a further shows that there are four heating conductors 612 such as, for example, conducting rods or heat pipes. The heating conductors 612 are located substantially vertically in the heat exchanger 604 and extend into the upper end area of the PCM 605 from the heat exchanger core 620.

Figure 6B:
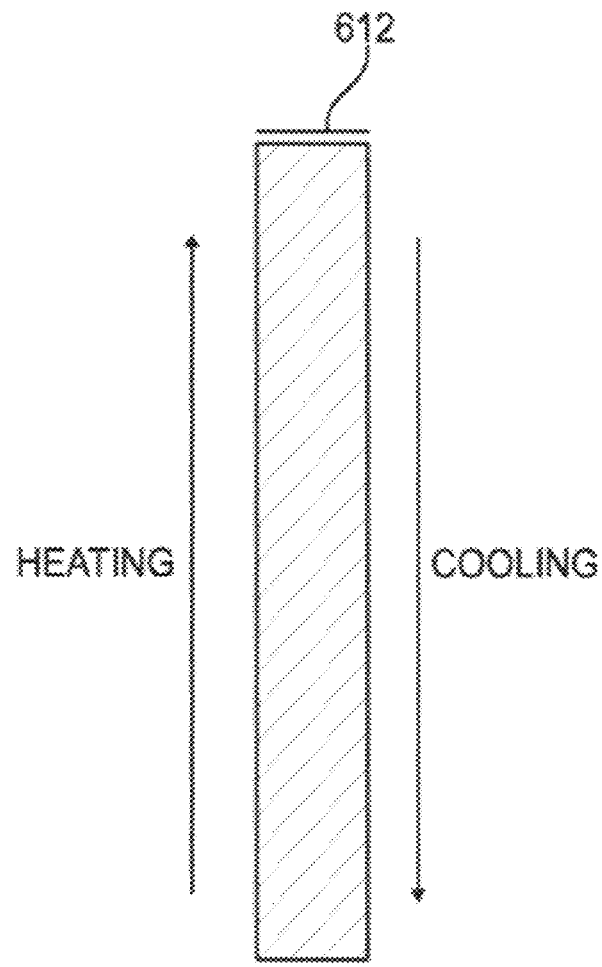

FIG. 6b is a cross-section of a heating conducting rod or heat pipe 612 as shown in FIG. 6a. FIG. 6b shows that heat travels up the way on the heat conducting rod or heat pipe and cooling travels down the heat conducting rod or heat pipe.

Figure 7:
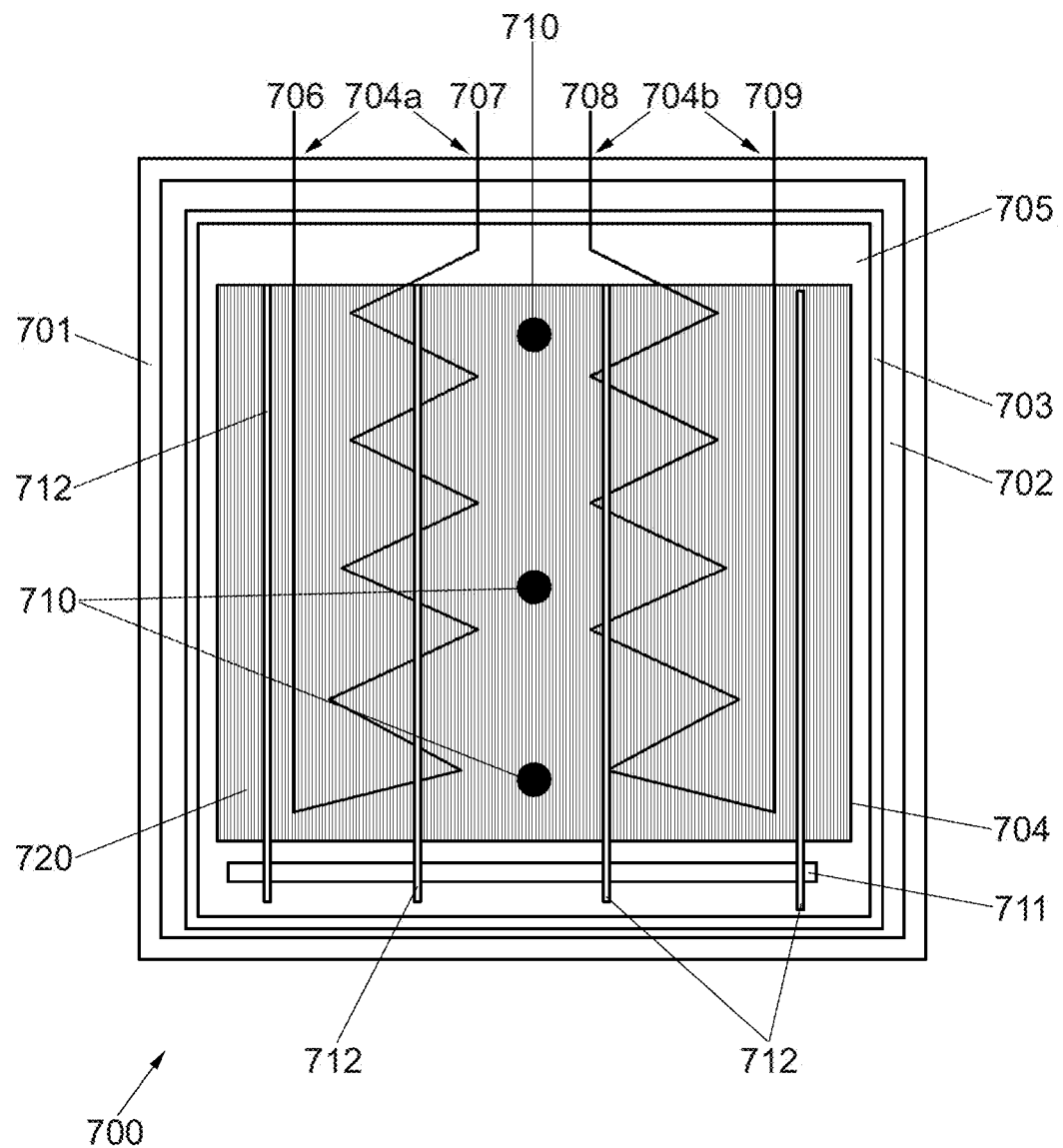
FIG. 7 represents a heat battery according to a further embodiment of the present invention where conducting plates are integrated into a heat exchanger core and the conducting plates extend into a heated zone of the heat battery below a heat exchanger.

FIG. 7 relates to a heat battery 700 where rather than using metal rods as above in FIGS. 6a and 6b—this embodiment relates to integrating thermal plates (e.g. conducting thermal plates such as metal plates) within a heat exchanger core (e.g. a heat exchanger finned core). The plates extend into the heated zone of the heat battery beneath the heat exchanger.

In the heat battery 700 shown in FIG. 7 there is a heat battery case 701, an insulation layer 702 and a PCM enclosure 703. As shown in FIG. 7 there is also a heat exchanger 704 and heat exchanger core 720 which preferably may be a heat exchanger finned core.

FIG. 7 also shows that there is a heat exchanger circuit 704a (heat exchanger circuit 1) and a heat exchanger circuit 704b (heat exchanger circuit 2).

Located within the PCM enclosure 703 there is a PCM 705. Located on the upper surface of the heat battery case 701 there is an inlet 706 (e.g. inlet circuit 1), an outlet 707 (e.g. circuit 1), an inlet 708 (e.g. circuit 2) and an outlet 709 (e.g. circuit 2).

There are also sensors 710. As shown in FIG. 7 there are preferably three sensors 710. The first sensor is located towards the upper end of the PCM enclosure 703, a further sensor located in about the middle of the PCM enclosure 703 and a further sensor is located towards the lower end of the PCM enclosure 703.

FIG. 7 also shows that there is a heating device 711 located below the lower end of the heat exchanger 704. The heating device 711 is therefore fully immersed in the PCM 705.

FIG. 7 further shows that there are, for example, four plates 712. The plates are located substantially vertically in the heat exchanger 704 and optionally extend into the lower end area of the PCM 705 and through the heating device 711. There may be any suitable number of plates which may be oriented in any suitable orientation through the heat exchanger 704. It has been found that it is preferred that the plates 712 are entered substantially vertically to aid the transfer of heat upwards and cooling downwards along the plates 712.

The plates 712 may be formed from a conducting thermal material such as any suitable metal and/or alloy. The plates 712 may be relatively thick to aid the heat transfer. The plates 712 may be substantially planar and oriented substantially vertically in the heat battery 700.

The plates 712 may be relatively thick such as about 0.1-5 cm thick, about 0.1-2 cm thick or about 0.1-0.5 cm thick.

Figure 8:
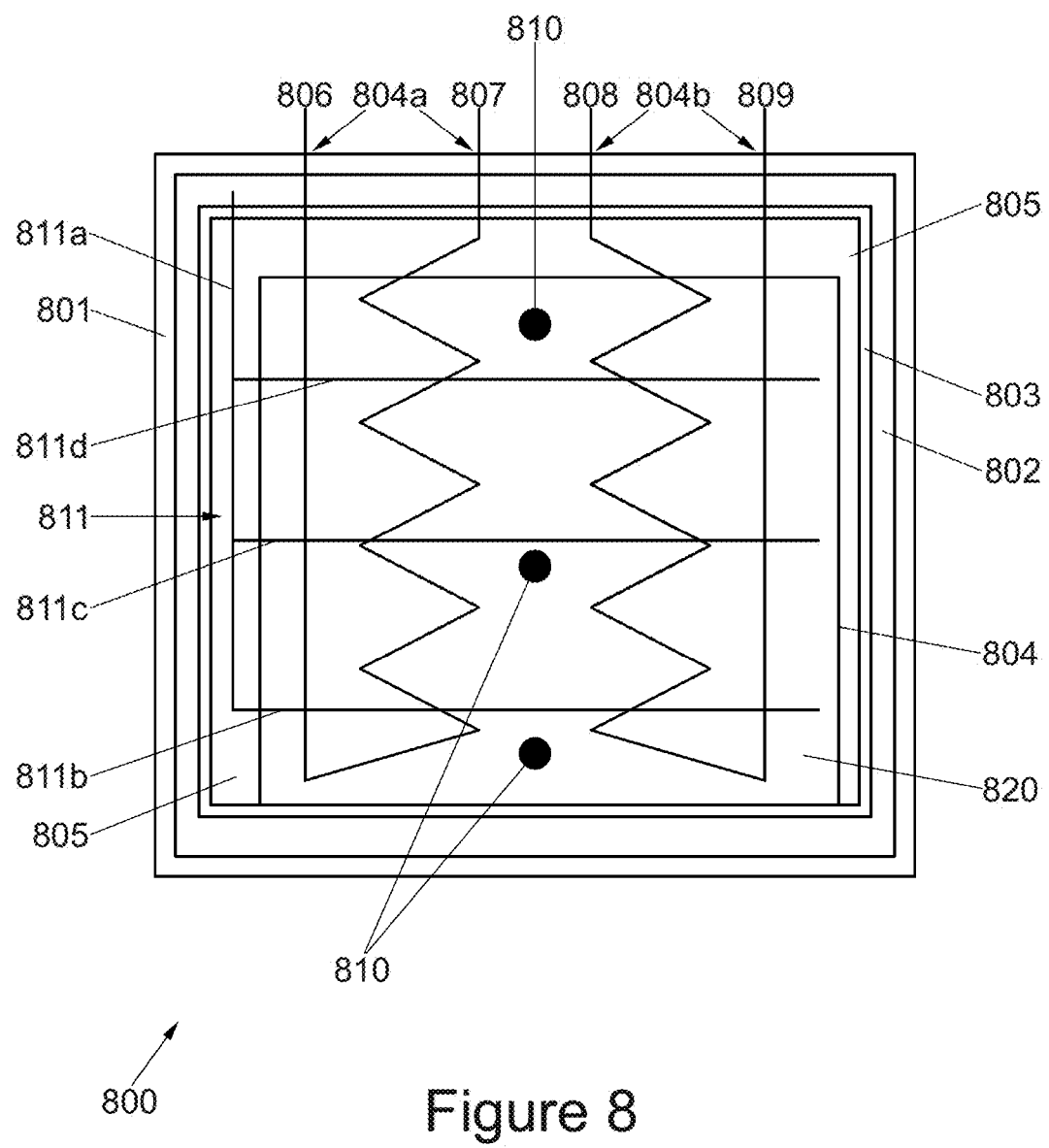
FIG. 8 represents a further heat battery according to further embodiment of the present invention where the heat battery comprises a substantially L-shaped electrical heating device embedded in a heat exchanger.

FIG. 8 relates to a further heat battery 800 according to the present invention. The heat battery 800 comprises a substantially L-shaped electrical heating device embedded in the heat exchanger e.g. a heat exchanger finned core. This is described below.

In the FIG. 8 there is a heat battery 800 which comprises a heat battery outer case 801, an insulation layer 802 and a PCM enclosure 803. There is also a heat exchanger 804 and a heat exchanger core 820 (e.g. a heat exchanger finned core). There is a heat exchanger circuit 804a (heat exchanger circuit 1) and a heat exchanger circuit 804b (heat exchanger circuit 2).

FIG. 8 also shows that there is a PCM 805 located within the PCM enclosure 803.

Located on the upper side of the PCM enclosure 803 there is an inlet 806 (e.g. inlet circuit 1), an outlet 807 (e.g. circuit 1), an inlet 808 (e.g. circuit 2) and an outlet 809 (e.g. circuit 2).

There are also sensors 810. As shown in FIG. 8 there are preferably three sensors 810. The first sensor is located towards the upper end of the PCM enclosure 803, a further sensor located in about the middle of the PCM enclosure 803 and a further sensor is located towards the lower end of the PCM enclosure 803 and PCM 805.

As shown in FIG. 8, the L-shaped electrical heating device 811 comprises a substantially vertical located portion 811a which extends down through the PCM 805. Extending tangentially from the substantially vertical portion 811a there are three substantially horizontally located portions 811b, 811c, and 811d. There may be any number such as a single or a plurality of substantially vertically located portions and substantially horizontally located portions.

One substantially horizontally located portion 811b may extend in the lower quarter of the heat exchanger core 820, the horizontally located portion 811c may extend substantially through the middle portion of the heat exchanger core 820 and the third horizontally located portion 811d may extend through the upper quarter of the heat exchanger 804. The horizontally located portions may be located in any suitable area of the heat exchanger core 820.

As shown in FIG. 8, in the heat battery 800 the heating device 811 and, in particular, the substantially horizontally located portions 811b, 811c, 811d are embedded into the core of the heat exchanger 814 (e.g. the finned core of a fin tube heat exchanger). The heating device 811 is preferably at least partially submersed in the PCM 805.

It has been found in the heat battery 800 it is preferred to have an interference fit between the heating element 811 and parts of the heat exchanger core 820 such as the heat exchanger fins. This has surprisingly been found to provide an increased heat transfer surface with improved charge times.

The 'L' shaped heating devices with the substantially horizontal portions has also been found to provide a number of advantages such as:
1) Relief for any expansion of the PCM 805 during its phase change (melting and freezing); and
2) A simple termination of the cables required for operation of the heat battery at the top of the heat battery.

As shown in FIG. 8, the substantially horizontally located portions 811b, 811c, 811d of the heating device 811 are placed at specific heights within the heat exchanger core 804 (e.g. a finned core) depending on the heat batteries footprint and aspect ratio to give better performance regarding, even charging, time to charge, partial draw offs and expansion characteristics.

The positioning of the substantially horizontally located portions 811b, 811c, 811d of the heating device 811 have been found to lessen the following issues:

d) Excessive local pressure which can damage the battery cell case;
e) Rapid overheating of PCM above its safe working limits
f) Overheating of heating device resulting in its reduced life span or failure.

The heat battery 800 shown in FIG. 8 has been found to be an ideal embodiment for a hybrid hot water heater which uses both stored heat as well as providing heating device power to instantaneously heat a domestic hot water supply.

Figure 9:
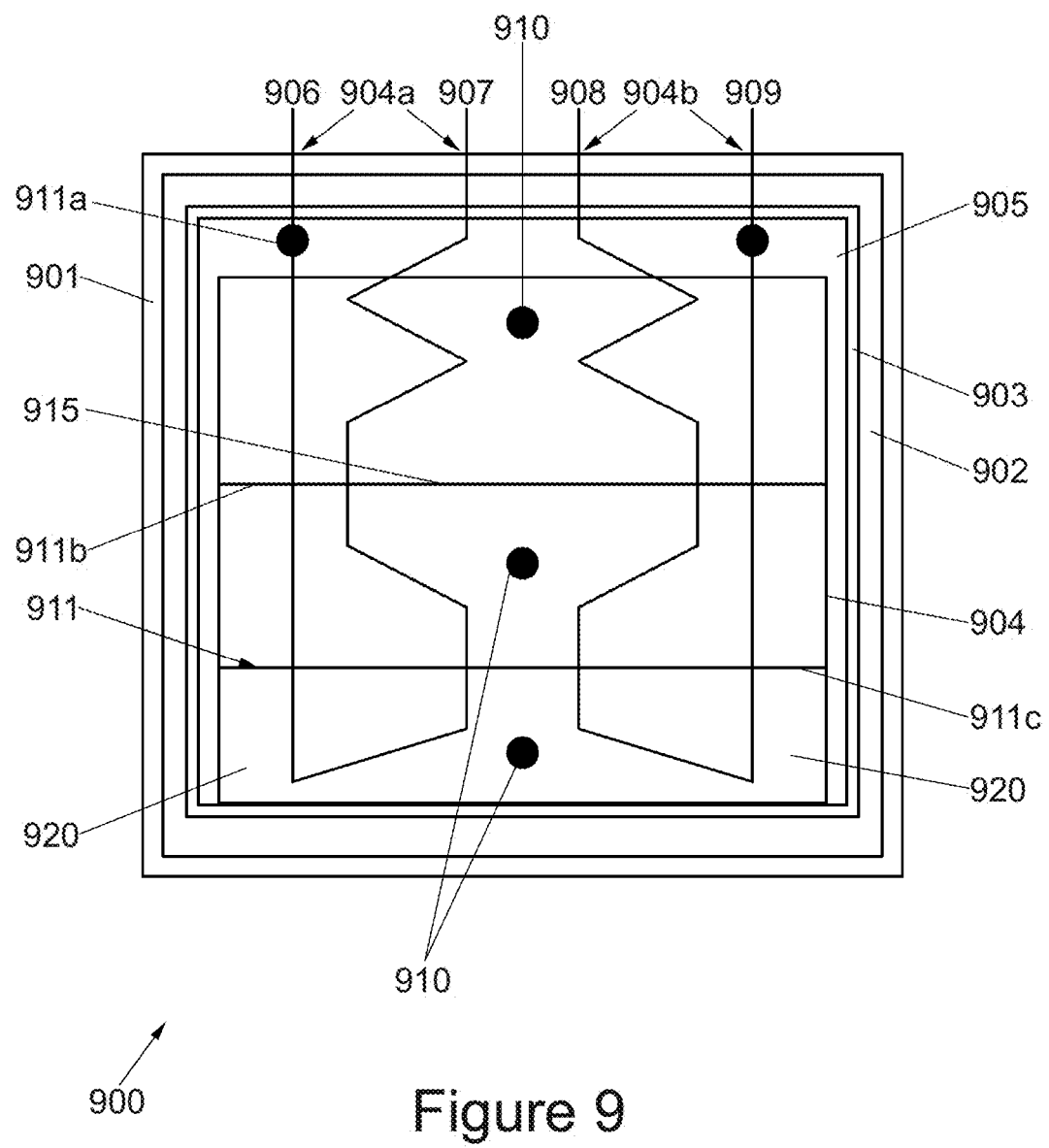
FIG. 9 represents a further heat battery according to a further embodiment of the present invention where heating devices (e.g. electrically heated tubular heaters) are embedded into a heat exchanger core which may comprise conducting elements e.g. metal tubes such as copper tubes.

FIG. 9 represents a heat battery 900 where heating devices (e.g. electrically heated tubular heaters) are embedded into a heat exchanger core which may comprise metal conducting elements e.g. conducting tubes such as copper tubes.

In the heat battery 900 shown in FIG. 9 there is a heat battery case 901, an insulation layer 902 and a PCM enclosure 903 holding PCM 905. There is also a heat exchanger 904 and a heat exchanger core 920.

Located on the upper side of the PCM enclosure 903 there is an inlet 906 (e.g. inlet circuit 1), an outlet 907 (e.g. circuit 1), an inlet 908 (e.g. circuit 2) and an outlet 909 (e.g. circuit 2).

There are also sensors 910. As shown in FIG. 9 there are preferably three sensors 910. The first sensor is located towards the upper end of the PCM enclosure 903, a further sensor located in about the middle of the PCM enclosure 903 and a further sensor is located towards the lower end of the PCM enclosure 903.

In FIG. 9, the heat battery 900 comprises heating devices 911 such as electric heating devices. In particular, the heating devices 911 comprise an electric heating device 911a which is located in the upper portion of the heat battery 900 between the PCM enclosure 903 and the heat exchanger core 920. In particular, the electric heating device 911a may be embedded in a manifold of the heat battery 900.

FIG. 9 also shows that there are electric heating devices 911b, 911c which are embedded in a passageway 915 in the heat exchanger core 920. The passageway 915 may extend substantially horizontally across the heat exchanger core 920 and turn in a 'U'-bend FIG. 9 also shows that there is a second heating device 911c extending substantially horizontally across the heat exchanger core 920.

Figure 10:
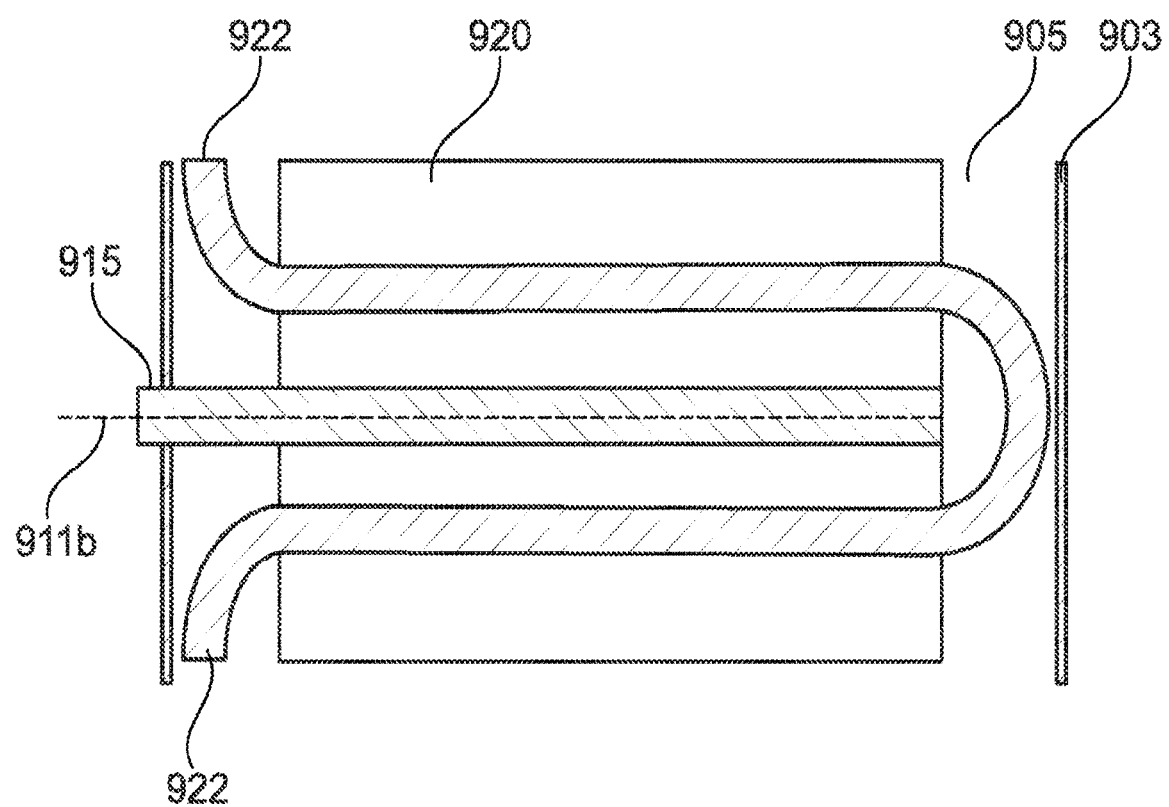
FIG. 10 represents a further heat battery according to a further embodiment of the present invention showing a configuration for embedding a skipped row into a heat exchanger.

FIG. 10 is a view showing the heating device 911b located in passageway 915. In FIG. 10, there is shown the PCM enclosure 903 and the PCM 905. Located within the PCM enclosure 903 and the PCM 905 there is the heat exchanger 904. The heat exchanger 904 may be a finned core heat exchanger.

FIG. 10 shows that there is a passageway 922 which is, for example, a tube for the heat exchanger 904. As shown in FIG. 10, the passageway 922 may extend around the passageway 915—providing a 'skipped' arrangement.

FIG. 10 therefore relates to an embodiment where there is an electrical heater embedded into a heat exchanger and, in particular, in passageways (i.e. tubes which may be made from copper or any other suitable conductive material) extending through the heat exchanger core.

In the embodiment shown in FIGS. 9 and 10, the heating devices 911b, 911c are embedded into the heat exchanger core 904 and preferentially and optionally not into the PCM 905 directly. There are a number of different options in which to embed the heating devices 911b, 911c. The heating devices 911b, 911c may be embedded in a number of ways such as:

As shown in the embodiment in FIG. 9, the heating devices 911b, 911c and the passageway 922 may provide an inlet extending from the working fluid i.e. the PCM 905. The heating devices 911b, 911c may be embedded in the larger diameter manifolds on the inlets to which connect to the smaller capillaries that feed through the heat exchanger finned core. This means the heating devices 911b, 911c are within the working fluid and thus charging is even throughout the battery. The operation of the heating devices 911b, 911c is linked to the ancillary plant equipment and is managed by a heat battery controller.

FIG. 10 shows where a circuit 915 (e.g. a skipped row tube) and a portion of a heat exchanger such as a heat exchanger finned core (FIG. 10) are embedded. By skipping rows in the heat exchanger finned core, the 'skipped tubes' can be populated by several heaters at various positions throughout the finned block. Advantages of this are that the skipped rows are expanded into the finned block giving superior heat transfer from the tubes to the fins.

In both variations shown in FIGS. 9 and 10 the heating devices are directly in contact with the heat exchanger and thus an improved and consistent heat transfer is achieved. Additionally, the elements are never in direct contact with the PCM and thus they do not need to be compatible with the PCM. This leads to more options for heaters with reduced costs and increased reliability and robustness. The heater elements will be accessible for servicing and maintenance without exposure of the servicing personnel to the PCM. Higher power elements may be used and the PCM operating conditions are not of concern from the higher power surface loading of the heater.

Figure 11A:
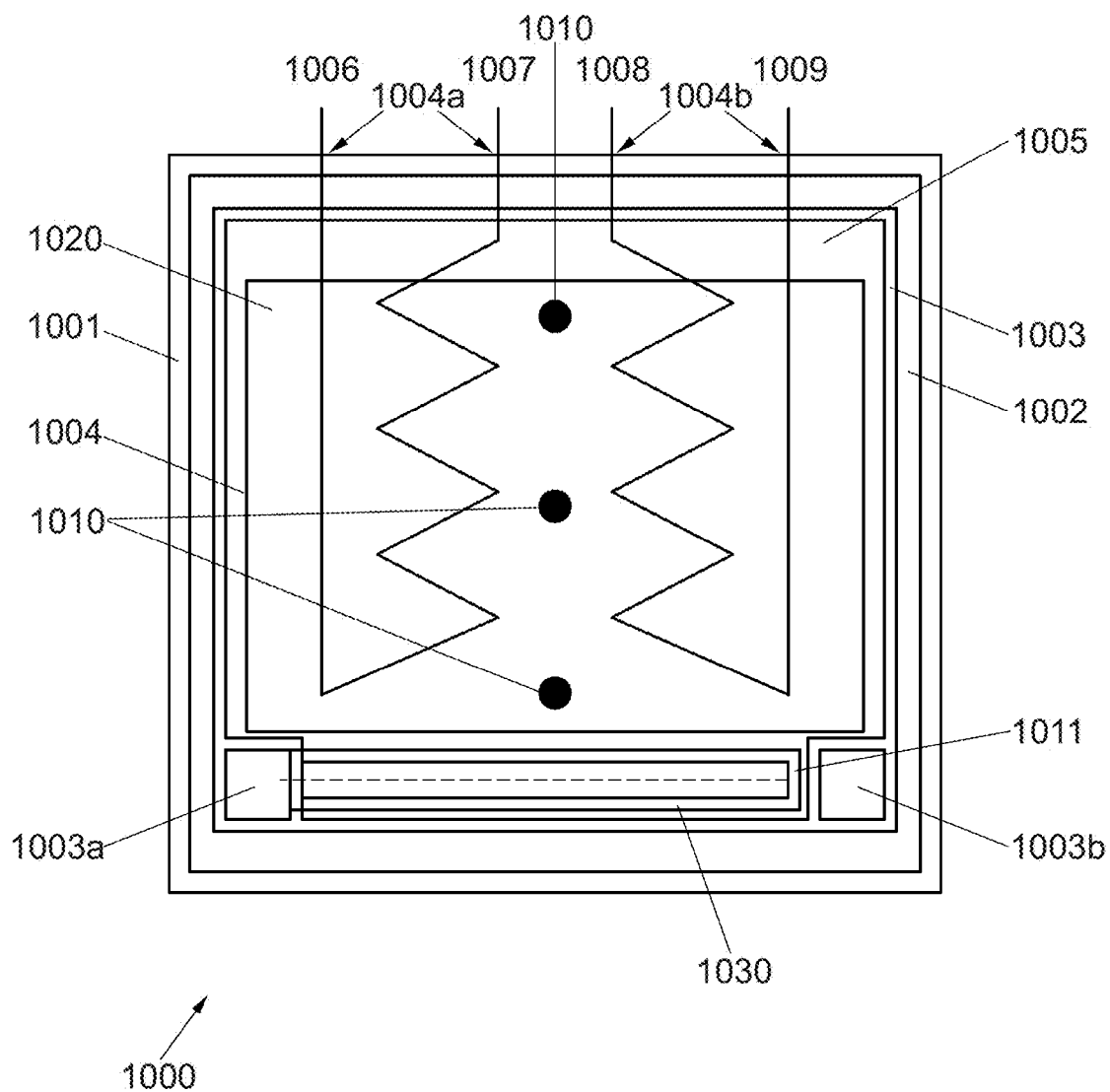
FIGS. 11a represents a further heat battery according to a further embodiment of the present invention where there is a heating device embedded and/or located in a housing containing material which is efficiently able to transfer and/or spread heat.
Figure 11B:
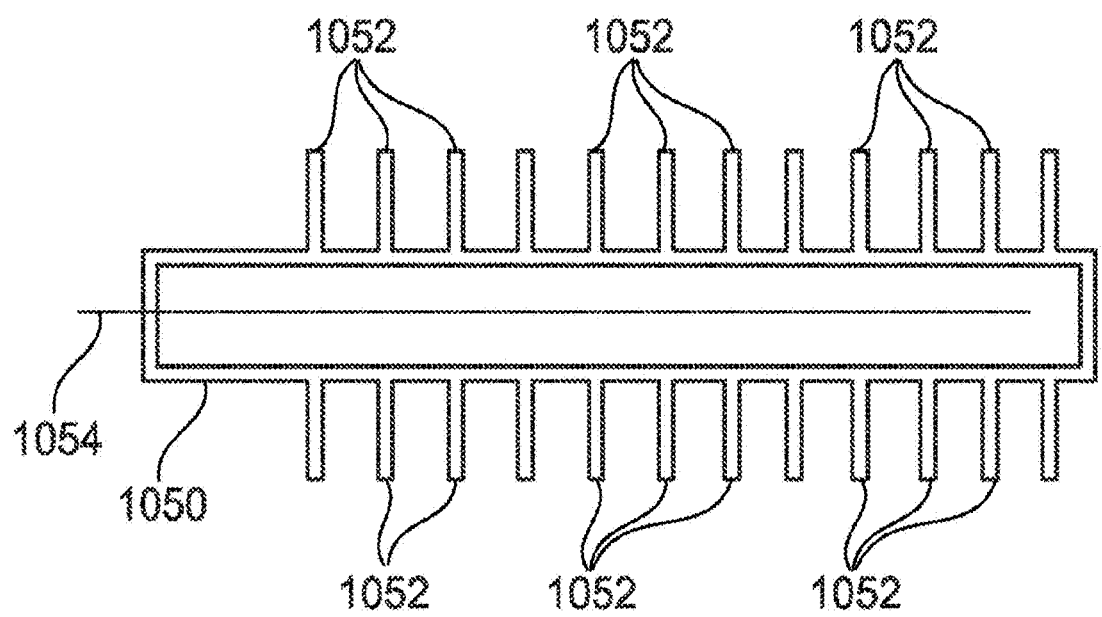
FIG. 11b represents further heat battery according to a further embodiment of the present invention where there is a heating device embedded and/or located in a housing containing material which is efficiently able to transfer and/or spread heat and where there are funds extending down the length of the housing.

FIGS. 11a and 11b represents a further heat battery according to the present invention. In the heat battery there is a heating device which is embedded and/or located in a housing containing material which is efficiently able to transfer and/or spread heat. The material therefore allows for better transfer of heat from the heating device to the heat exchanger core and/or phase change material. This is explained in more detail below.

As shown in FIG. 11a, there is a heat battery 1000 with a heat battery case 1001 and an insulation layer 1002 located inside the heat battery case 1001. There is also a PCM enclosure 1003 and PCM 1005. There is also a heat exchanger 1004 and a heat exchanger core 1020.

In FIG. 11a there is located on the upper side of the PCM enclosure 1003 an inlet 1006 (e.g. inlet circuit 1), an outlet 1007 (e.g. circuit 1), an inlet 1008 (e.g. circuit 2) and an outlet 1009 (e.g. circuit 2).

There are also sensors 1010. As shown in FIG. 11a there are preferably three sensors 810. The first sensor is located towards the upper end of the PCM enclosure 1003, a further sensor located in about the middle of the PCM enclosure 1003 and a further sensor is located towards the lower end of the PCM enclosure 1003.

As shown in FIG. 11a there is a heating device 1011 (e.g. an electric heating device) located towards the lower end of the PCM enclosure 1003 and underneath the heat exchanger core 1020 (e.g. a heat exchanger finned core). There is a heat exchanger circuit 1004a (heat exchanger circuit 1) and a heat exchanger circuit 1004b (heat exchanger circuit 2).

The heating device 1011 is located between two step features 1003a, 1003b and extends between these two step features 1003a, 1003b. The step features 1003a, 1003b are part of the PCM enclosure 1003.

The heating device is held within a housing 1030 which may be filled with a material/fluid capable of transferring and/or spreading heat evenly. The material/fluid may, for example, be any form of suitable oil and/or thermal paste.

In FIG. 11a, the heating device 1011 may be, for example, a tubular electrical heating device which may be located within the housing 1030 and surrounded by the material which is able to efficiently transfer and/or spread heat. The housing 1030 may therefore be filled with oil and/or thermal paste. In comparison to the embodiment found in FIG. 11b, the housing 1030 is not finned.

In the arrangement shown in FIG. 11a, the heating device 1011 is therefore embedded in a housing 1030 which is filled with thermal material capable of transferring and/or spreading heat evenly. The housing 1030 is preferably integral to the PCM enclosure 1003. The heating device 1011 does not interface with the PCM 1005.

The housing 1030 can either be plain or optionally finned to increase surface area and heat transfer from the heater to thermal material to housing and then the PCM 1005 but importantly reduce the surface loading of the heating device 1011 leading to a robust design with reduced service intervals. This has been found to be a significant technical advantage and increasing the lifetime of the heat battery 1000.

Utilising an oil bath in the housing 1030 means that the heating device 1011 does not need to have a high tolerance fit within the housing 1030 as required by cartridge heaters. Often both the heating device 1011 and housing 1030 may preferably be machined/specified appropriately to provide the heat transfer (through an interference fit) and be tapered to enable the heating device 1011 to be easily removed. This again is a further advantage of the present design.

The design of the heating device 1011 and housing 1030 found in FIG. 11a means that the heating device 1011 is easily removable and accessible by service personnel without exposure to the PCM 1005. The small volume of thermal material such as the oil is replaced during the service interval via an oil nipple in the housing. The heat battery 1000 is therefore very easily serviceable which is a further technical advantage.

FIG. 11b represents an alternative embodiment where the housing 1050, is similar to that found in FIG. 11a, but in this embodiment there are a range of fins 1052 extending down the length of the housing 1050. The fins 1052 are simply extended elongate plates which function as heat dissipation areas to increase surface area and hence transfer and/or spread heat energy. There is a heating device 1054 extending into and along at least part or substantially all of the internal length of the housing 1050.

Figure 12:
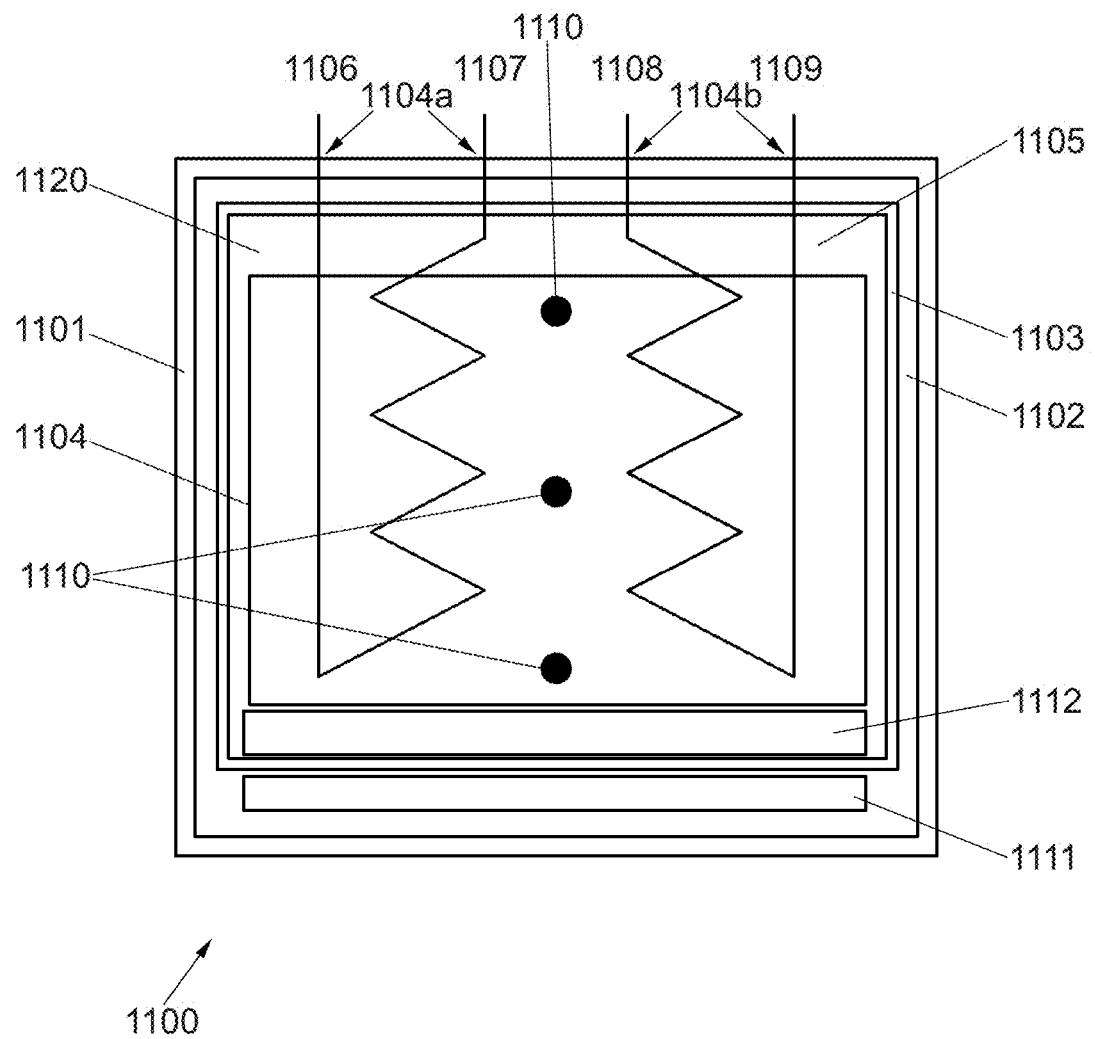
FIG. 12 represents a further heat battery according to a further embodiment of the present invention where there is a heating device located externally to a PCM enclosure and the heating is provided by an externally located induction heater.

FIG. 12 represents a further heat battery 1100 according to the present invention. In this variant the heating device is located externally to the PCM enclosure. Internally there is a conductive block and a current is induced via an external induction heater. This is discussed in more detail below.

FIG. 12 shows that there is a heat battery 1100 comprising a heat battery case 1101 and an insulation layer 1102 located inside the heat battery case 1101. There is also a PCM enclosure 1103 and PCM 1105. There is also a heat exchanger 1104 and a heat exchanger core 1120.

In FIG. 12, located on the upper side of the PCM enclosure 1103 there is an inlet 1106 (e.g. inlet circuit 1), an outlet 1107 (e.g. circuit 1), an inlet 1108 (e.g. circuit 2) and an outlet 1109 (e.g. circuit 2).

There are also sensors 1110. As shown in FIG. 12 there are preferably three sensors 1110. The first sensor is located towards the upper end of the PCM enclosure 1103, a further sensor located in about the middle of the PCM enclosure 1103 and a further sensor is located towards the lower end of the PCM enclosure 1103.

There is a heat exchanger circuit 1104a (heat exchanger circuit 1) and a heat exchanger circuit 1104b (heat exchanger circuit 2).

As shown in FIG. 12 there is a heating device 1111 located towards the lower end of the PCM enclosure 1003 and underneath the heat exchanger core 1104 (e.g. a heat exchanger finned core). In particular, in the heat battery 1100 shown in FIG. 12 the heating device 1111 is externally located outside of the PCM enclosure 1103 and at the bottom of the PCM enclosure 1103. The heating device 1111 is therefore located in between the bottom of the PCM enclosure 1103 and the bottom of the battery case 1101. In particular embodiments, the heating device 1111 is an induction heater.

The heating device 1111 may therefore be described as being externally located from the heat exchanger core 1104 and the PCM 1105.

As shown in FIG. 12, located above or substantially above the heating device 1111 and inside the PCM enclosure 1103 there is a layer of conductive material 1112 which extends along the bottom or substantially along the bottom of the PCM enclosure 1103. The function of the conductive material 1112 is to inductively transfer heat from the heating device 1111 which may be an inductive heater. The conductive material 1112 may therefore be in the form of a heat conductive metal and/or alloy block within which a current may be induced to produce and/or transfer heat.

Figure 13:
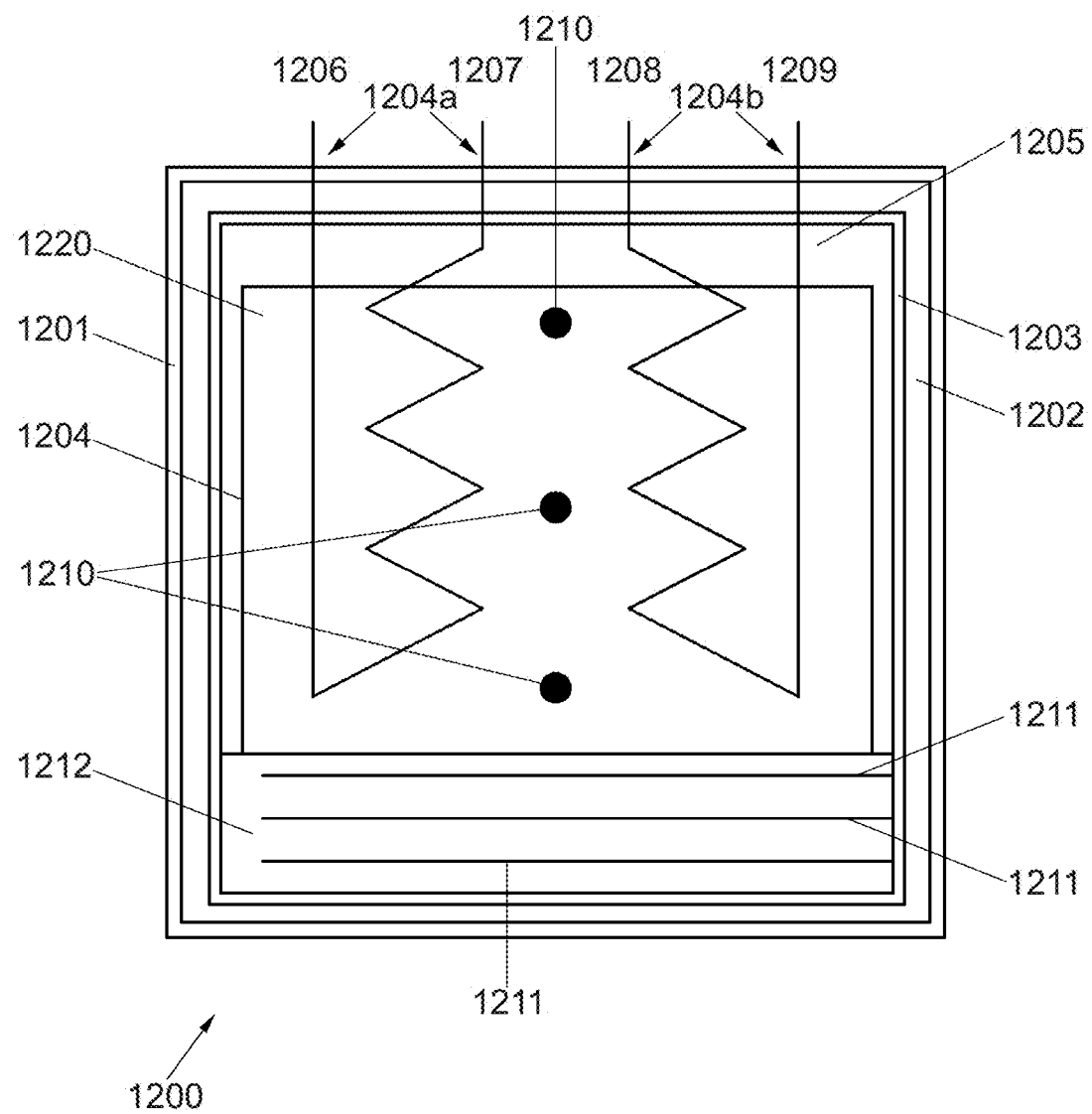
FIG. 13 represents a further heat battery according to a further embodiment of the present invention where there is at least one or a plurality of removable cartridge heating devices located inside a conductive block.

FIG. 13 represents a further heat battery 1200 according to the present invention. In this embodiment, in the heat battery 1200 there is at least one or a plurality of removable cartridge heating devices comprising an internally immersed conductive block. This is described in more detail below.

In the heat battery 1200 there is a heat battery case 1201 and an insulation layer 1202 located inside the heat battery case 1201. There is also a PCM enclosure 1203 and PCM 1205. There is also a heat exchanger 1204 and a heat exchanger core 1220.

In FIG. 13, located on the upper side of the PCM enclosure 1203 there is an inlet 1206 (e.g. inlet circuit 1), an outlet 1207 (e.g. circuit 1), an inlet 1208 (e.g. circuit 2) and an outlet 1209 (e.g. circuit 2).

There are also sensors 1210. As shown in FIG. 13 there are preferably three sensors 1210. The first sensor is located towards the upper end of the PCM enclosure 1203, a further sensor located in about the middle of the PCM enclosure 1203 and a further sensor is located towards the lower end of the PCM enclosure 1203.

There is a heat exchanger circuit 1204a (heat exchanger circuit 1) and a heat exchanger circuit 1204b (heat exchanger circuit 2).

As shown in FIG. 13 there is a block 1212 of material extending along the bottom of the PCM enclosure 1203 and located underneath the heat exchanger core 1220 and the PCM 1205. The block 1212 may extend completely or substantially or at least partially along from one side of the PCM enclosure 1203 to the other side. The block 1212 is comprised of conductive material such as any suitable metal and/or alloy. The block 1212 is therefore meant to transfer heat efficiently from inside the bottom of the PCM enclosure 1203 where heating devices are located.

Internally embedded within the block 1212 there is at least one or a series of cartridge heating devices 1211 which may be removable. In FIG. 13, there are shown three cartridge heating devices 1211 but there may be any suitable number. The cartridge heating devices 1211 extend substantially horizontally along the block 1212.

The cartridge heating devices 1211 are therefore internally located within the PCM enclosure 1203. The cartridge heating devices 1213 may therefore comprise a heat conductive metal and/or alloy block which is capable of efficiently transferring heat.

In the embodiment shown in FIG. 13, there is therefore a block 1212 which functions as a heat source embedded at the bottom of and inside the PCM enclosure 1213. The block 1212 has a large surface area compared to the embedded cartridge heating devices 1213.

A technical advantage of the cartridge heating devices 1211 is that these are accessible externally and thus easily removable as they are not in contact with the PCM 1205. The embodiment shown in FIG. 13 and the heat battery 1200 may therefore be very easily serviced.

This variant uses a heater block embedded at the bottom of the PCM enclosure. This block has a large surface area compared to the embedded cartridge heaters. The heaters are accessible externally and thus removable and are not in contact with the PCM.

Figure 14:
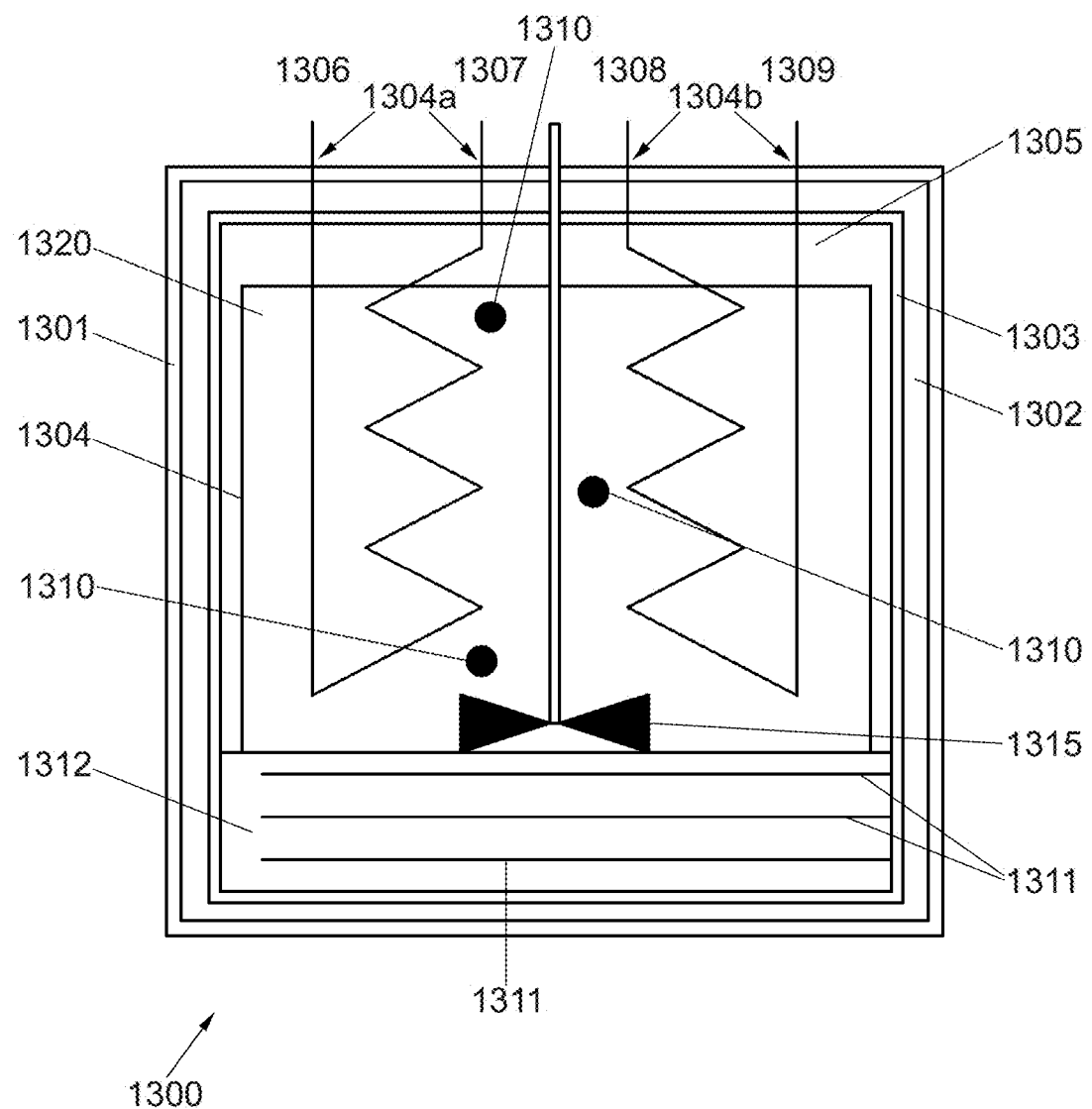
FIG. 14 represents a further heat battery according to a further embodiment of the present invention where there is at least one or a plurality of removable cartridge heating devices located inside a conductive block and where there is also a stirrer/agitator to mix PCM.

FIG. 14 represents a further heat battery 1300 according to the present invention. In this embodiment, in the heat battery 1300 there is at least one or a plurality of removable cartridge heating devices comprising an internally immersed conductive block and also an impeller agitator which mixes the PCM 1315 and aids heat transfer via forced convection. The addition of the impeller agitator therefore provides the following technical advantages:

Aiding heat transfer via forced convection
Agitating and mixing the PCM 1305 and its constituent components The battery 1300 shown in FIG. 14 is described in more detail below.

The battery 1300 comprises a heat battery case 1301 and an insulation layer 1302 located inside the heat battery case 1301. There is also a PCM enclosure 1303 and PCM 1305. There is also a heat exchanger 1304 and a heat exchanger core 1320.

In FIG. 14, located on the upper side of the PCM enclosure 1303 there is an inlet 1306 (e.g. inlet circuit 1), an outlet 1307 (e.g. circuit 1), an inlet 1308 (e.g. circuit 2) and an outlet 1309 (e.g. circuit 2).

There are also sensors 1310. As shown in FIG. 14 there are preferably three sensors 1310. The first sensor is located towards the upper end of the PCM enclosure 1303, a further sensor located in about the middle of the PCM enclosure 1303 and a further sensor is located towards the lower end of the PCM enclosure 1303.

There is a heat exchanger circuit 1304a (heat exchanger circuit 1) and a heat exchanger circuit 1304b (heat exchanger circuit 2).

As shown in FIG. 14 there is a block 1312 of material extending along the bottom of the PCM enclosure 1303 and located underneath the heat exchanger core 1320 and the PCM 1305. The block 1312 may extend completely or substantially or at least partially along from one side of the PCM enclosure 1303 to the other side. The block 1312 is comprised of conductive material such as any suitable metal and/or alloy. The block 1312 is therefore meant to transfer heat efficiently from inside the bottom of the PCM enclosure 1303.

Internally embedded within the block 1312 there is at least one or a series of cartridge heating devices 1311 which may be removable. In FIG. 14, there are shown three cartridge heating devices 1311 but there may be any suitable number.

The cartridge heating devices 1311 are therefore internally located within the PCM enclosure 1303. The cartridge heating devices 1311 may therefore comprise a heat conductive metal and/or alloy block which is capable of efficiently transferring heat.

In the embodiment shown in FIG. 14, there is therefore a block 1312 which functions as a heat source embedded at the bottom and inside the PCM enclosure 1303. The block 1312 has a large surface area compared to the embedded cartridge heating devices 1311.

In addition, the heat battery 1300 comprises a stirrer 1315 which may be any form of stirring device such as a rotating agitator. The stirrer 1315 may, for example, be located towards the bottom of the PCM enclosure 1303 and may be used to stir the PCM 1305 to improve the efficiency of the heat battery 1300 and heat transfer.

Figure 15A:
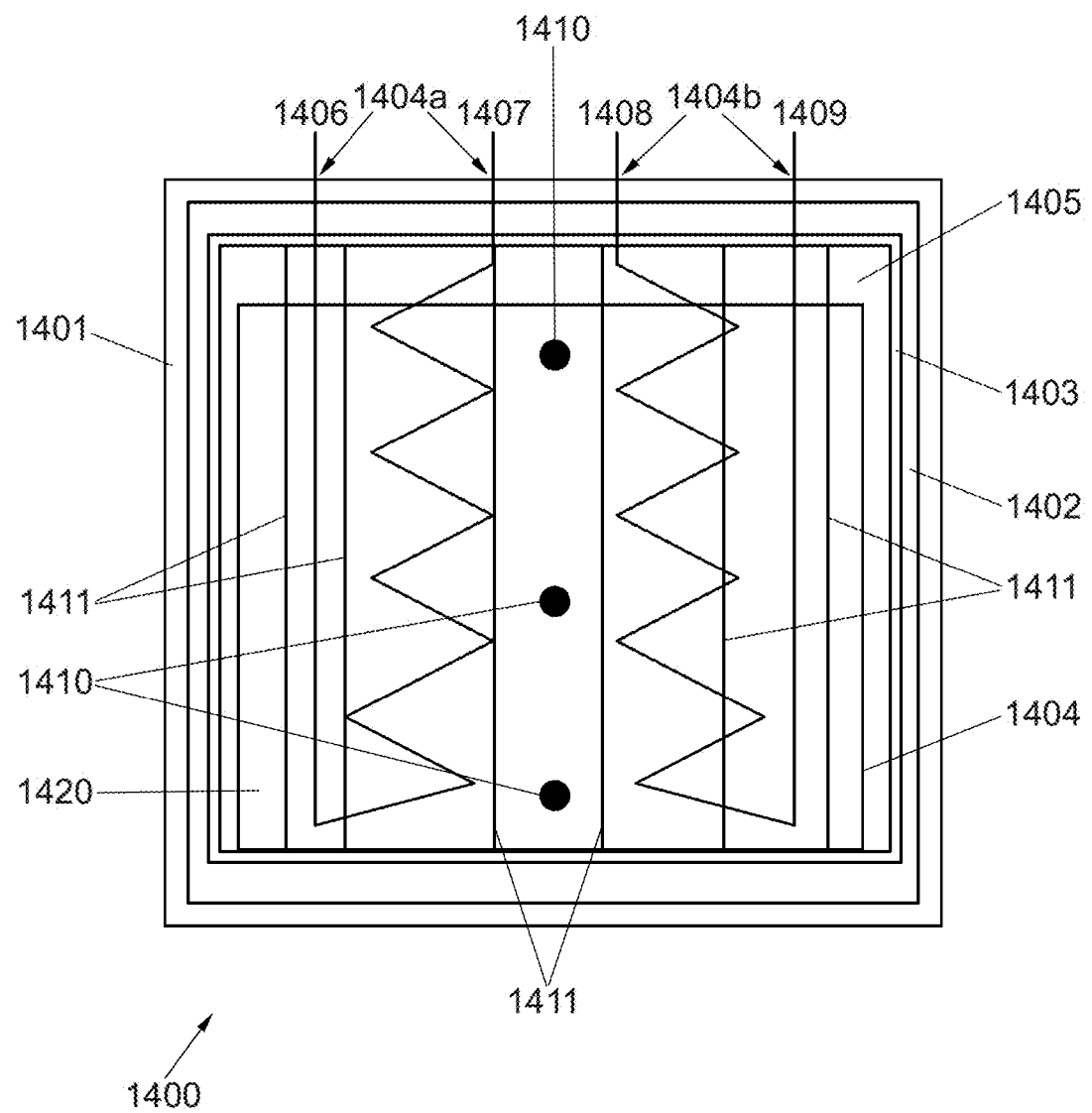
FIGS. 15a and 15b represent a further embodiment of the present invention where there is shown a heat battery where there are heating devices in the form of heating device networks extending substantially vertically inside the PCM enclosure.

FIG. 15a represents a further embodiment of the present invention where there is shown a heat battery 1400. In the heat battery 1400 there are heating devices extending substantially vertically inside the PCM enclosure. The heating devices may be in the form of heater element networks. This is described in more detail below.

The battery 1400 comprises a heat battery case 1401 and an insulation layer 1402 located inside the heat battery case 1401. There is also a PCM enclosure 1403 and PCM 1405. There is also a heat exchanger 1404 and a heat exchanger core 1420.

In FIG. 15a, located on the upper side of the PCM enclosure 1403 there is an inlet 1406 (e.g. inlet circuit 1), an outlet 1407 (e.g. circuit 1), an inlet 1408 (e.g. circuit 2) and an outlet 1409 (e.g. circuit 2).

There are also sensors 1410. As shown in FIG. 15a there are preferably three sensors 1410. The first sensor is located towards the upper end of the PCM enclosure 1403, a further sensor located in about the middle of the PCM enclosure 1403 and a further sensor is located towards the lower end of the PCM enclosure 1403.

As shown in FIG. 15a there is a series of heating devices 1411 extending substantially vertically within the PCM enclosure 1403. There may be any number of heating devices 1411 such as a single heating device or a plurality of heating devices. The embodiment shown in FIG. 15a which is just a particular example shows six heating devices 1411 located substantially vertically within the PCM enclosure 1403.

Figure 15B:
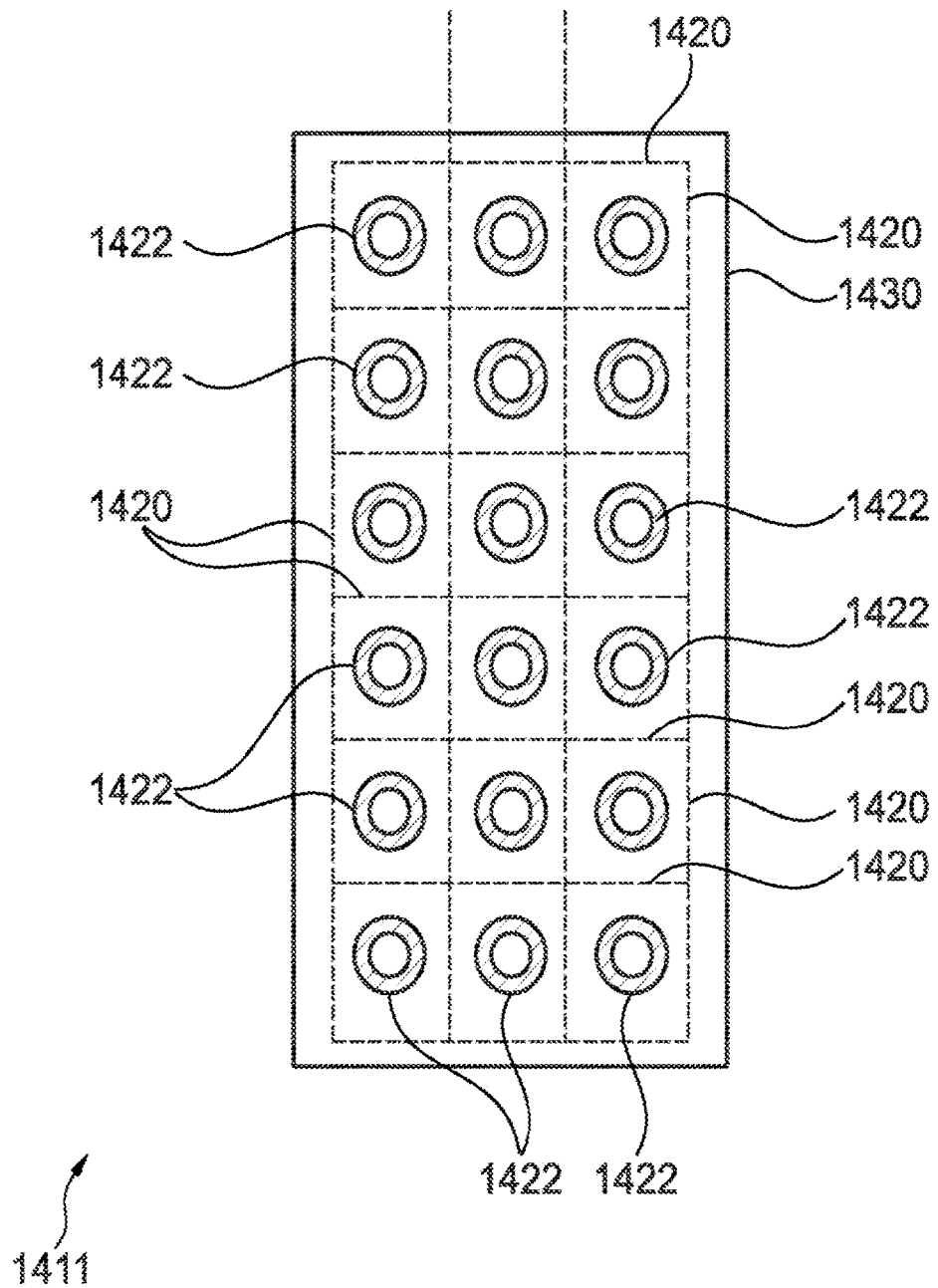

FIG. 15b is an expanded cross-sectional view of the heating device 1411. FIG. 15b shows that the heating device 1411 comprises a heating device network 1420 in a grid-like pattern. Within the grid sections there are tubular sections 1422 which provide efficient heat transfer. The tubular sections 1422 may be copper tubes. The heating device 1411 is in the form of a fin 1430.

In the arrangement shown in FIGS. 15a and 15b and during the manufacture of the heat exchanger 1404 the normal fins are replaced with a 'heated fin' i.e. the heating device 1411. The positions of the heating devices 1411 are, for example, determined by the aspect ratio and height of the heat battery 1400 and the heating device 1411 used can be chosen to give the desired power input depending on what thermal energy is required. The heated fins in the form of heating devices 1411 are, in particular embodiments, an integral part of the heat exchanger 1404 and thus would be non-removable. However, there is the possibility to put in place a number of extra heated fins i.e. heating devices 1411 more than required for redundancy to ensure robustness of the heat battery.

Due to the high heated surface area of this design the power density of each heated fin (i.e. heating devices 1411) would be very low and would improve robustness and longevity of the system.

The density of the heater element network such as shown in FIG. 15*b* from top to bottom of a heated fin can also be varied to optimise charging and discharging capabilities to suit the application.

In the heat battery 1400 shown in FIGS. 15*a* and 15*b*, the heating devices 1411 may therefore be used to replace the usual fins found in heat exchangers. In particular embodiments, positive temperature coefficient (PTC) heaters may be used which may be slid onto heat transfer tubes such as copper tubes replacing the standard fins found in heat exchangers.

Figure 16A:
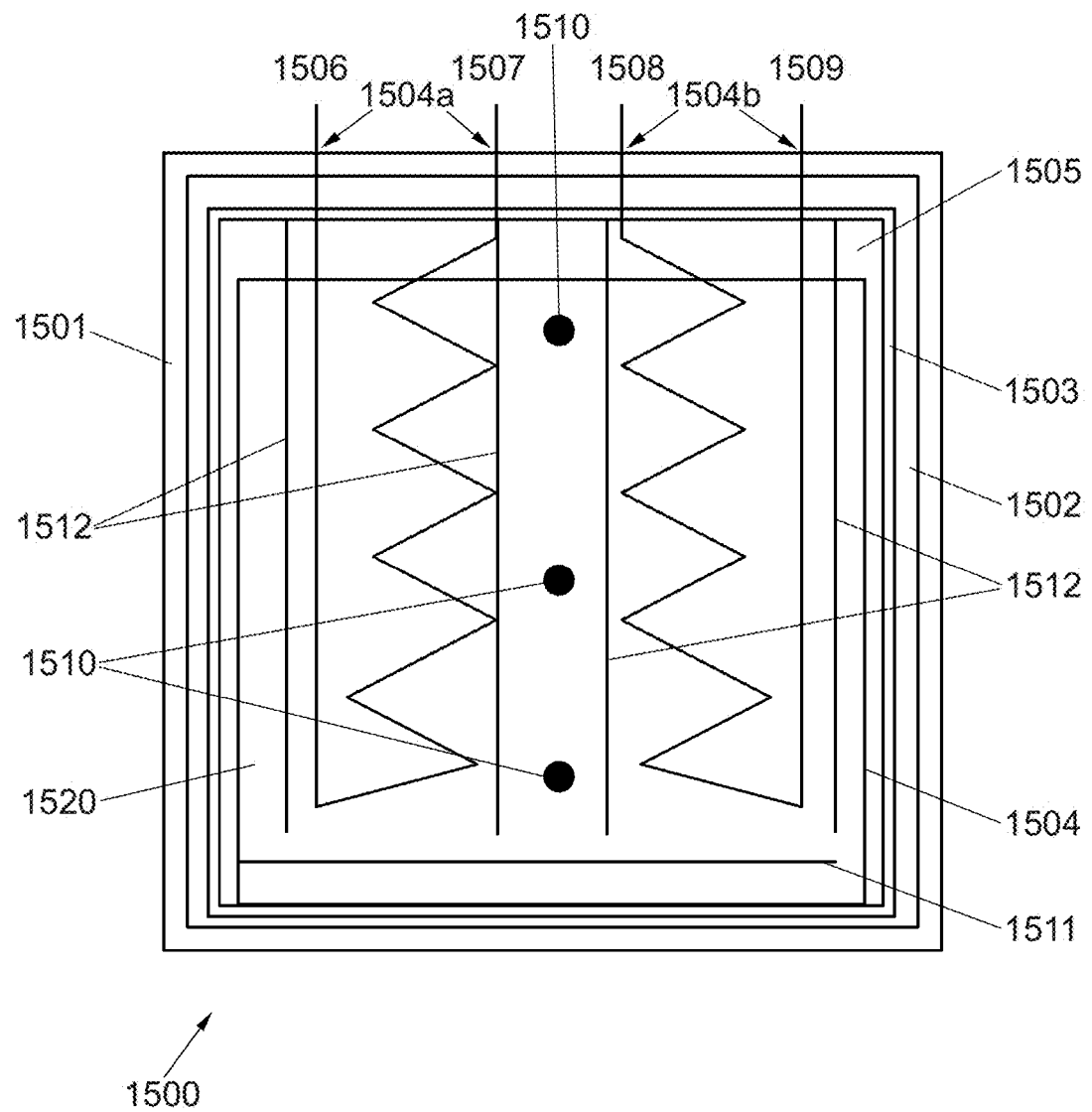
FIGS. 16a and 16b represent a further embodiment of the present invention where there is shown a heat battery where there are heating devices in the form of substantially vertically oriented low powered vertical heaters in the form of, for example, heat pipes or conduction rods to aid PCM circulation.

FIG. 16*a* represents a further embodiment of the present invention where there is shown a heat battery 1500. In the embodiment shown in the heat battery 1500 there are heating devices in the form of substantially vertically oriented low powered vertical heaters in the form of, for example, heat pipes or conduction rods to aid PCM circulation. This has been found to create a pumping action for the PCM material within the heat battery.

The arrangement shown in FIG. 15*a* has been found to have a number of technical advantages such as:
1) Increasing the heat transfer from the base of the heat battery up the core optimising charge times; and
2) Creating paths for the melted PCM to travel, relieving any pressure build up caused by the phase change and expanding PCM.

In the heat battery 1500 there is a heat battery case 1501 and an insulation layer 1502 located inside the heat battery case 1501. There is also a PCM enclosure 1503 and PCM 1505. There is also a heat exchanger 1504 and a heat exchanger core 1520.

In FIG. 16*a* located on the upper side of the PCM enclosure 1503 there is an inlet 1506 (e.g. inlet circuit 1), an outlet 1507 (e.g. circuit 1), an inlet 1508 (e.g. circuit 2) and an outlet 1509 (e.g. circuit 2).

There are also sensors 1510. As shown in FIG. 16*a* there are preferably three sensors 1510. The first sensor is located towards the upper end of the PCM enclosure 1503, a further sensor located in about the middle of the PCM enclosure 1503 and a further sensor is located towards the lower end of the PCM enclosure 1503.

There is a heat exchanger circuit 1504*a* (heat exchanger circuit 1) and a heat exchanger circuit 1504*b* (heat exchanger circuit 2).

As shown in FIG. 16*a* there is a heating device 1511 located towards the bottom of the PCM enclosure 1503. The heating device 1511 extend substantially across the bottom of the heat exchanger 1504.

FIG. 16*a* also shows that there is a plurality of substantially vertically oriented low powered vertical heaters 1512. The vertical heaters 1512 may be in the form of low powered heating devices or alternatively heat tubes. There may be any suitable number of vertical heaters 1512.

In the embodiment shown in the heat battery 1500 there are four substantial vertically oriented heaters 1512 which extend from the upper surface of the PCM enclosure 1503 through the PCM 1505 and into the heat exchanger 1504.

Figure 16B:
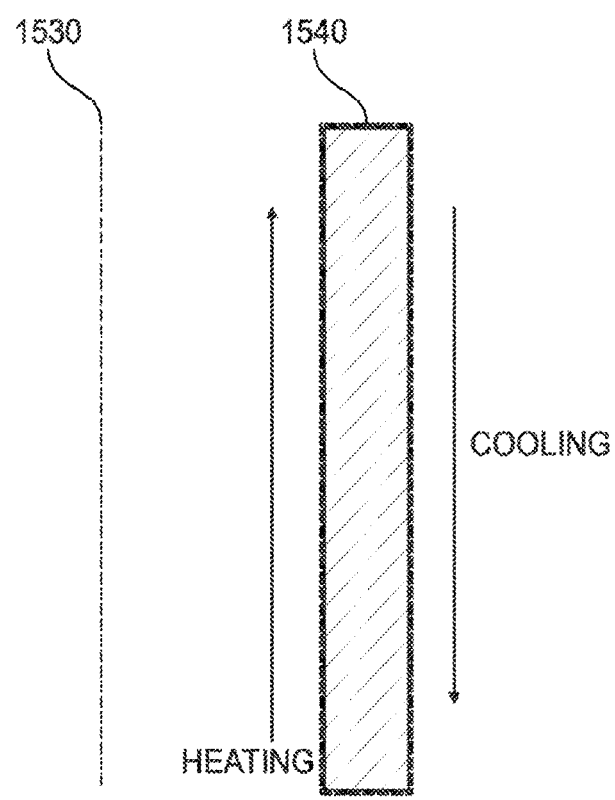

FIG. 16*b* shows a cross-sectional expanded view of different types of vertical heaters which may be used. On the left-hand side of FIG. 16*b* is a low powered heating device 1530. On the right-hand side of FIG. 16*b* there is shown a heat tube 1540. FIG. 16*b* shows that heat travels up the vertical heater and cooling flows down through the vertical heater.

Figure 17:
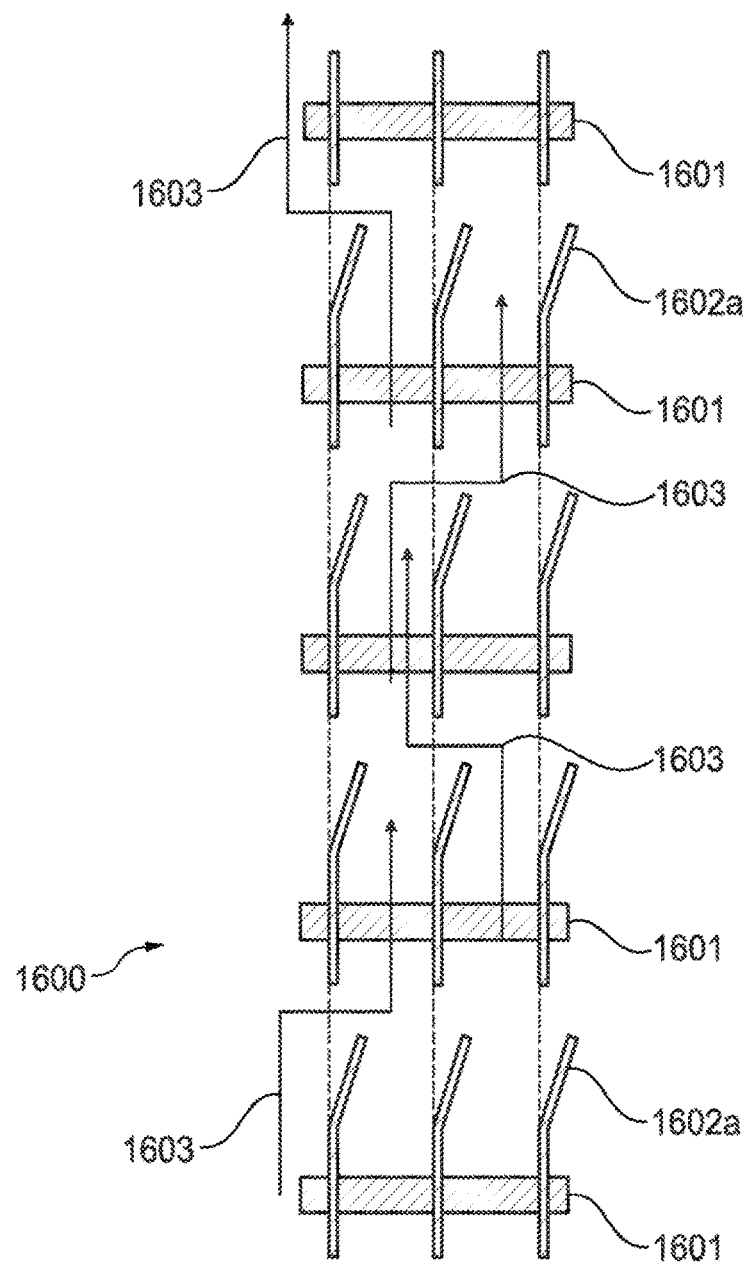
FIG. 17 represents a further embodiment of the present invention and shows a cross-section of a louvred fin design which may be used in a heat battery according to the present invention.

FIG. 17 represents a cross-section of a louvred fins design generally designated 1600 according to the present invention. The louvred fin design 1600 comprises a series of tubes 1601 (e.g. copper tubes) which may be used to transfer heat. Within and around the tubes 1601 PCM material flows. The flow of PCM material is shown by reference numeral 1603. As shown in FIG. 17, the flow of the PCM material may be directed using the louvres 1602*a* in the fins 1602. The fins 1602 therefore comprise a louver which can in effect be fully opened so that it is completely planar or switched into an angular form so that it can be used to direct the flow of PCM material. The louvred fin design 600 may be incorporated into any of the embodiments and heat batteries described above.

Whilst specific embodiments of the invention have been described above, it will be appreciated that departures from the described embodiments may still fall within the scope of the invention. For example, any suitable type of enclosure may be used for the heat battery. In addition, any form of suitable PCM material and electronic control mechanism may be used. Moreover, the heating devices may be any suitable form such as electrically heated or any other form of heating system as envisaged within the scope of the present application. Furthermore, any form of heat exchanger may be used in the heat batteries described in the present invention.

The invention claimed is:

1. A phase change material (PCM) heat battery comprising:
a PCM enclosure capable of holding a PCM;
the PCM located in the PCM enclosure;
an electronic control system for controlling the PCM heat battery;
at least one heating device located in the PCM heat battery;
wherein the at least one heating device is capable of heating the PCM;
a plurality of sensors located in different vertical locations of the PCM heat battery;
wherein the plurality of sensors are capable of monitoring a physical characteristic or temperature of the PCM and other parts of the PCM heat battery;
wherein the at least one heating device is located within the PCM enclosure and therefore in direct contact and immersed in the PCM;
wherein at least one thermal conductor is vertically inserted into a heat battery case and is immersed or partially immersed into the PCM;
wherein the at least one thermal conductor is located vertically in a heat exchanger and extends into the PCM; and
wherein the electronic control system controls the physical characteristic or temperature of the PCM by applying heat directly to the PCM through the at least one heating device.

2. The phase change material (PCM) heat battery according to claim 1, wherein the at least one heating device comprises is at least two heating devices.

3. The phase change material (PCM) heat battery according to claim 2, wherein the at least two heating devices are located at different vertical levels within the PCM enclosure.

4. The phase change material (PCM) heat battery according to claim 1, wherein there is an outer casing for the PCM heat battery and an insulation layer extending around the PCM enclosure.

5. The phase change material (PCM) heat battery according to claim 1, wherein the PCM heat battery is a dual port heat battery.

6. The phase change material (PCM) heat battery according to claim 1, wherein the heat exchanger comprises fins, wherein the heat exchanger is located within the PCM enclosure.

7. The phase change material (PCM) heat battery according to claim 1, wherein the electronic control system comprises a low power circuit (LPC) and a high power circuit (HPC) which are used to provide an electrical connection for the PCM heat battery and wherein the electronic control system comprises an HPC inlet and an HPC outlet.

8. The phase change material (PCM) heat battery according to claim 1, wherein there is a battery controller along with a battery charge status signal and a battery charging control signal.

9. The phase change material (PCM) heat battery according to claim 1, wherein there is an overheat safety cut-off thermostat S0 and a range of temperature sensors distributed throughout different vertical locations of the heat battery to obtain a temperature across the whole working medium, the PCM, or the heat exchanger.

10. The phase change material (PCM) heat battery according to claim 1, wherein the heating device is located in an upper half of the PCM enclosure and immersed in the PCM.

11. The phase change material (PCM) heat battery according to claim 1, wherein the electronics control system comprises a battery controller allowing the at least one heating device to be completely controlled or switched on or off when required and wherein the amount of power or heating being delivered by the at least one heating device is also controlled depending on a measurement from a sensor located in the PCM enclosure and PCM.

12. The phase change material (PCM) heat battery according to claim 1, wherein the at least one heating device is a plurality of electric heating devices that are located at different heights within the PCM enclosure or PCM.

13. The phase change material (PCM) heat battery according to claim 1, wherein there is a first heating device located in an upper half of the PCM enclosure and a second heating device located in a lower half of the PCM enclosure, both the first and second heating devices being immersed in the PCM.

14. The phase change material (PCM) heat battery according to claim 1, further comprising thermal plates that are vertically oriented and extend into or at least partially into a heat exchanger core and extend into a heated zone of the heat battery below a heat exchanger.

15. The phase change material (PCM) heat battery according to claim 1, wherein the at least one heating device comprises a non-planar heating device that is embedded in a heat exchanger core.

16. The phase change material (PCM) heat battery according to claim 15, wherein the non-planar heating device comprises a vertical portion which extends down through the PCM and extending tangentially from the vertical portion there is at least one horizontally located portion; or wherein a first horizontally located portion extends along a lower quarter of the heat exchanger core, a second horizontally located portion extends through a middle portion of the heat exchanger core and a third horizontally located portion extends through an upper quarter of the heat exchanger core; or wherein the one non-planar heating device comprises horizontally located portions that are embedded or at least partly embedded into the core of the heat exchanger.

17. The phase change material (PCM) heat battery according to claim 1, wherein there is at least one heating device embedded into a heat exchanger core which comprises conducting elements; and optionally wherein the at least one heating device is embedded in a manifold of the PCM heat battery; or wherein the at least one heating device is embedded in a circuit which extends horizontally across the heat exchanger core and wherein the circuit is embedded in the heat exchanger;

wherein there is a passageway which extends around the circuit and extending around the circuit there is the at least one heating device.

18. The phase change material (PCM) heat battery according to claim 1, wherein the at least one heating device comprises a heating device that is embedded or located in a housing containing material which is able to efficiently transfer or spread heat.

19. A phase change material (PCM) heat battery according to claim 1, wherein there is at least one removable cartridge heating device located within an internally immersed conductive block wherein the conductive block is within the PCM enclosure and below the heat exchanger.

20. A method of applying thermal energy to a phase change material (PCM) heat battery comprising:

providing a PCM enclosure capable of holding a PCM;

providing the PCM located in the enclosure;

providing an electronics control system for controlling the PCM heat battery;

providing at least one heating device located in the PCM enclosure and immersed in the PCM;

wherein the at least one heating device is capable of heating or charging the PCM;

providing a plurality of sensors located in different vertical locations of the PCM heat battery capable of monitoring a physical characteristic or temperature of the PCM and other parts of the PCM heat battery;

wherein the at least one heating device is located within the PCM enclosure and therefore in direct contact and immersed in the PCM;

wherein at least one thermal conductor is vertically inserted into a heat battery case and which is immersed or partially immersed into the PCM;

wherein the at least one thermal conductor is located vertically in a heat exchanger and extends into the PCM; and wherein the electronic control system controls the physical characteristic or temperature of the PCM by applying heat through the at least one heating device.

* * * * *

UNITED STATES PATENT AND TRADEMARK OFFICE
CERTIFICATE OF CORRECTION

Page 1 of 1

PATENT NO. : 12,173,930 B2
APPLICATION NO. : 17/263363
DATED : December 24, 2024
INVENTOR(S) : Bissell et al.

It is certified that error appears in the above-identified patent and that said Letters Patent is hereby corrected as shown below:

In the Specification

Column 3, Line 24: Please correct "SO" to read --S0--

Column 12, Line 48: Please correct "SO" to read --S0--

Column 14, Line 39: Please correct "SO" to read --S0--

In the Claims

Column 28, Line 64, Claim 2: Please correct "comprises is at least" to read --comprises at least--

Signed and Sealed this
Twenty-seventh Day of May, 2025

Coke Morgan Stewart
*Acting Director of the United States Patent and Trademark Office*